United States Patent [19]

Thoma

[11] 4,325,126
[45] Apr. 13, 1982

[54] CENTRALLY CONTROLLED CONVEYOR SYSTEM

[75] Inventor: Ferdinand Thoma, Berlin, Fed. Rep. of Germany

[73] Assignee: Siemens Aktiengesellschaft, Berlin & Munich, Fed. Rep. of Germany

[21] Appl. No.: 148,807

[22] Filed: May 12, 1980

Related U.S. Application Data

[63] Continuation-in-part of Ser. No. 949,874, Oct. 10, 1978, Pat. No. 4,240,148.

[51] Int. Cl.³ .................... G06F 15/46; B65G 43/00
[52] U.S. Cl. ............................... 364/478; 364/900; 198/349; 474/1
[58] Field of Search ............ 474/1; 222/52, 53; 364/478, 200, 900; 209/548, 559, 546, 552, 564, 922; 198/349

[56] References Cited

U.S. PATENT DOCUMENTS

| | | | |
|---|---|---|---|
| 3,639,728 | 2/1972 | Helfand et al. | 209/111.5 X |
| 3,725,867 | 4/1973 | Jordan | 214/11 X |
| 3,803,556 | 4/1974 | Duffy | 198/38 X |
| 3,803,561 | 4/1974 | Yucius | 214/11 X |
| 3,868,643 | 2/1975 | Bullivant | 222/55 X |
| 3,895,716 | 7/1975 | Ugo | 209/74 M |
| 4,027,246 | 5/1977 | Caccoma et al. | 29/430 X |
| 4,121,818 | 10/1978 | Riley et al. | 270/54 |

*Primary Examiner*—Edward J. Wise
*Attorney, Agent, or Firm*—Hill, Van Santen, Steadman, Chiara & Simpson

[57] ABSTRACT

Station-individual control sets of dispatching and receiver stations are connected to a multiconductor address line which is connected to a central program control device. All control sets are connected via an operation decoder to a multiconductor control line connecting to the program control device. After the output to the control line of operation information from the program control device which introduces a destination information transfer, the operation decoder of the marked dispatching station responds and applies signal voltage to a destination selection device connected to the address line in parallel with an address decoder.

10 Claims, 4 Drawing Figures

CENTRALLY CONTROLLED CONVEYOR SYSTEM

BACKGROUND OF THE INVENTION

This is a continuation-in-part of application Ser. No. 949,874, filed Oct. 10, 1978, now U.S. Pat. No. 4,240,148.

FIELD OF THE INVENTION

The invention relates to a conveyor system with dispatching and receiver stations exhibiting station-individual control sets which are coupled to the actuation and signal devices of the system, said control sets being connected in parallel to a multiwire address line connecting to a central program control device, whereby the dispatching stations respectively each exhibit a destination selection device, and dispatching stations ready for dispatching operation are marked by cyclically applying station-individual address information to the address line by means of the program control device, and giving-off an acknowledgement signal for the program control device to an acknowledgement line jointly assigned to all stations by means of an address decoder responding to the applied address information when coincidence is present.

The address of the marked dispatching station remains on the address line in this conveyor system after the acknowledgement signal is output to the program control device, whereby the dispatching station is activated to additional control processes which are initiated and carried out by the control set of this station. The extent of the logic linkage of the control components of the control sets can be relatively extensive depending upon the type of stations utilized and the size of the system.

The destination information is transmitted to the intended receiver station by the dispatching station occupied on the multiwire address line by means of maintaining the address information. The dispatching information is produced by a destination selection device which is generally realized in the form of keys wired in an arbitrary code. The output of the destination information predetermined by the keying system proceeds via a multiwire destination transmission line to which all stations are connected in parallel. The receiver station responding via this line, transmits a reply via an additional acknowledgement line to which all control sets of the stations are also connected in parallel; said reply can only be received by that station which is activated by the maintenance of the address information on the address line. Subsequently, that station introduces the dispatching of the conveyer receptacle to the selected receiver station.

Such a control can only be employed in such conveyer systems in which a single transport path extends past all stations as in a series system. Examples for such conveyor systems are smaller pneumatic conveyer systems and belt conveyer systems. If a conveyer system exhibits branchings, i.e. shunt systems, permitting several transport directions at particular locations, the known control can no longer be employed as all control processes are carried out by the dispatching station and the receiver station alone. Taking such different transport possibilities for conveyer receptables into account would only be possible with a considerable expansion of the control-technical logic within the control sets of the individual stations, whereby respectively different control concepts within the control sets; and different electrical conductor line paths for connecting return, storage and holding devices for different systems would have to be provided. However, the electrical conductor line expense for employing the known control in a continuous series system must be considered very high.

SUMMARY OF THE INVENTION

The invention's underlying objective is to provide a control with a line (e.g. electrical conductor line) expense as low as possible, which respectively facilitates the same design of the control sets of the stations at least in principle for conveyer systems with arbitrary design of dispatching and receiver stations and also with an arbitrary course of transport paths between the stations, and provides a line path and connection of the control sets to the lines as independent from such alterations of the stations or the system structures in particular, as possible. This objective in combination with the initially defined conveyer system is resolved in that all control sets are provided with an operation decoder which can be switched ready for reception by means of a response signal of the assigned address decoder the operation decoder being connected to a multiwire control line which is connected to the program control device, that after the output of operation information from the program control device to the control line which introduces a destination information transmission, the operation decoder of the marked dispatch station responds and connects operating voltage to the destination selection device, which is connnected to the address line in parallel with the address decoder, and that the program control device marks the receiver station with the aid of address information corresponding with the destination information and outputs operation information to the dispatching station and to the receiver station which introduces, monitors and concludes the conveyer process.

Accordingly, in the inventive conveyer system all control sets are connected to the address line and to the control line in parallel with the same value, whereby all control sets in principle are permanently in receiver status and the actuation of all control sets proceeds with the aid of the address information. As an essential point is also to be considered that respectively only one single control set is activated via the address line or via the control line at a specific time, and that the activation proceeds in each case by means of the central program control device, whereas a transmission of address information, destination information, operation information or acknowledgement signals between individual control sets is impossible.

The control structure provided in the inventive conveyer system is particularly then to be considered advantageous when drive, return or blocking devices are provided in addition to the dispatching and receiver stations. Blowers and values of a pneumatic conveyer system are to be understood as such drive devices which need not necessarily be situated in the course of the conveyer path defined by a dispatching and receiver station. An example for a return device is a shunt connecting a continuous belt path with a branching-off belt path in a belt conveyer system. Stores, for example, can be considered blocking devices which are provided with a circulating lift at the location of the junction of the belt path, into which respectively only one conveyer receptacle can be introduced per circulating segment. An advantageous further development of the invention in this conjunction provides that such drive, return and blocking devices are connected in parallel to the address line, the acknowledgement line and the control line, with control sets being coupled to the control and signal circuits for such devices.

The program control device includes these control sets in the control program in the same manner as the control sets of the dispatching and receiver stations. Thus, the program control device marks the control sets with the aid of the corresponding address information, the control sets of a conveyer path being consecutively assigned to drive, return and blocking devices by means of a dispatching station and a receiver station and the program control device outputs operation information to the appertaining control devices. The adjustment of the control structure provided in the inventive conveyer system to different conveyer systems thus results by including all control sets of all locations of the conveyer system provided with control and/or signal devices into the data channel formed by the address line, the control line and the acknowledgment line, and undertakes the actual individualization of the control by means of adjustments within the central program control device (by means of altering the data describing the system configuration).

An advantageous further development of the invention in regard to the design of the control sets provides that operation signal stores are respectively connected to the output connections of the control set individual operation decoders, the outputs of said operation signal stores being respectively connected to one of the control and signal devices. Each output of an operation decoder is thus assigned to a specific mechanical component of the appertaining control and/or signal device, whereby for the adjustment of the different switching elements of the control and/or signal devices for different conveyer systems or control devices, signal adjustment circuits are assigned to these devices. The signal adjustment circuits can contain merely an adjustment to the voltage or output level provided for the switching elements, on one hand; however, the signal adjustment circuits can also involve input circuit levels of separate control circuits for some control or signal devices employed in conveyer systems. An example of such a control device can be seen in the switch-on and switch-off control of an electric motor, for example, which drives a rotatable shunt element of a belt conveyer path.

The standardization of set operation signal stores necessary for a trouble-free execution of subsequent conveyer processes results advantageously in that the operation decoder exhibits a reset output for the operation signal stores. At specific times—expediently then when the corresponding control set is no longer actively engaged in a continuous conveyer process—operation information is output by the central program device leading to the actuation of the reset output and thus to the resetting of the operation signal stores in the operation decoder, whereby a resetting of the corresponding mechanical components of the respective station or of the control or signal device proceeds into its output position.

In accordance with an additional embodiment of the invention, the circuit status of the control and signal devices is monitored by the program control device, and the output of additional operation information is made dependent upon the presence of the circuit status, provided therefor, of the interrogated control or signal devices. The operation decoder exhibits output connections for this purpose, which respectively convey switch signals for AND-gates after corresponding interrogation information from the program control device to the control line is output, being respectively connected to an output of a status signal store assigned to one of the control and signal devices with its other input, respectively, and form the inputs of an OR-gate connected to the acknowledgement line with the aid of its outputs.

The necessary resetting of the status signal stores can thereby also proceed by corresponding outputs of the operation decoder; an advantageous further development of the invention, however, provides that the status signal stores exhibit a reset input activated by the switching-through of the respectively subordinate AND-gate. During the interrogation of the status signal store an impulse is thereby obtained from the output signal of the subordinate AND-gate, said impulse switching the status signal store. The information of the status signal store thus is lost with the interrogation via a corresponding output of the operation decoder. The considerable advantage of this measure is the saving of operation decoder outputs, and thus also in the saving of conductors of the control line.

An additional embodiment of the invention provided that the operation decoders of all control sets are connected to a common pulse line, which conveys impulses as determined by the program control device, when a corresponding address information is present on the address line. The impulses are delayed vis-a-vis the operation information in order not to effect the actuation of the operation decoders while the operation information is in a transient status.

The invention is hereafter explained with the aid of a sample embodiment illustrated in the accompanying sheets of drawings; and other objects, features and advantages will be apparent from this detailed disclosure.

DETAILED DESCRIPTION

Figure 1:
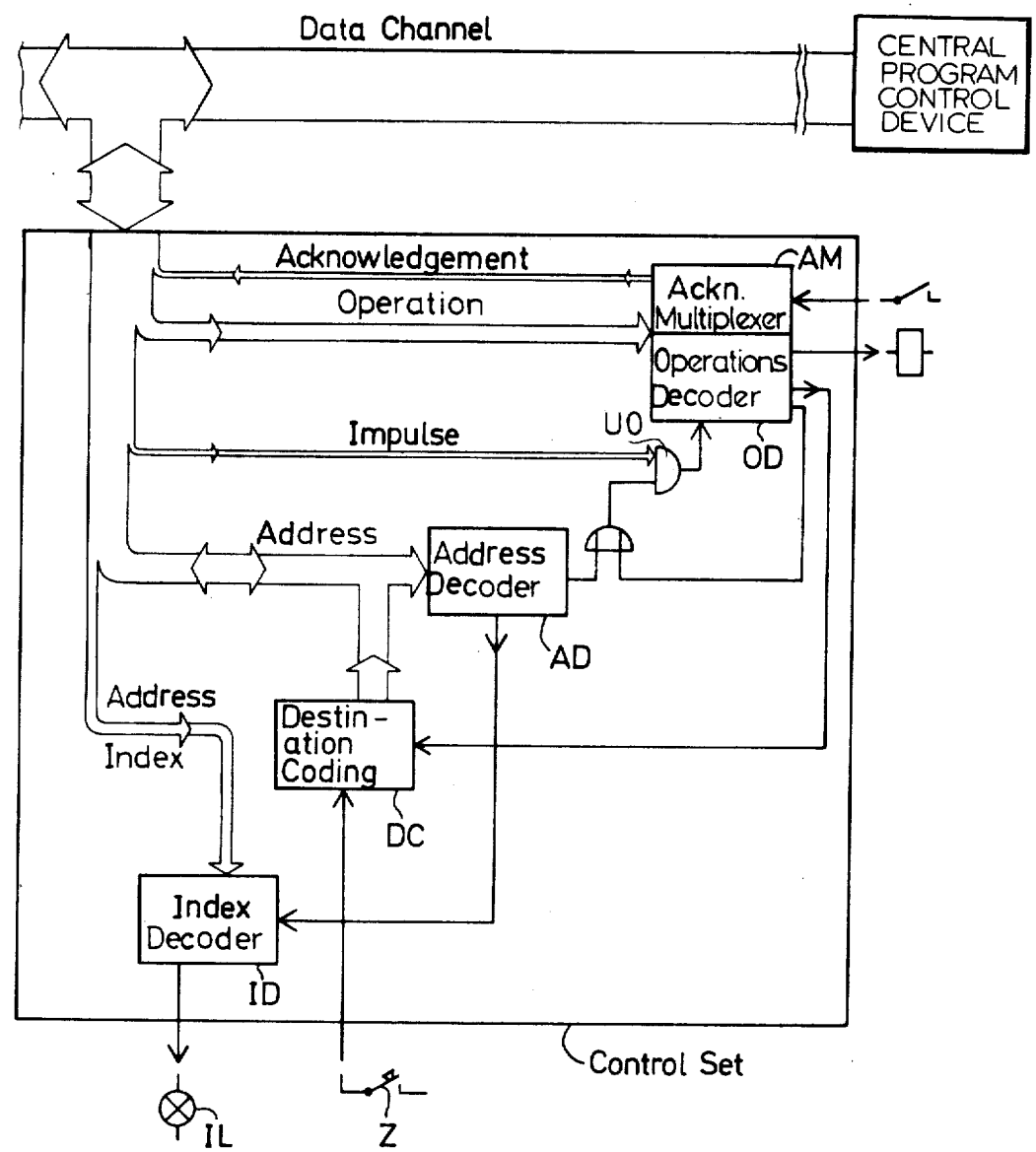
FIG. 1 therein illustrates the information flow between a control set of a combined dispatching and receiver station and the central program control device, and also illustrates the information flow within the control set.

The signal flow scheme of the control set of a combined dispatching and receiver station illustrated in FIG. 1 shows the coupling of the essential components of such a control set with one another and relative to the data channel, which represents the connection of all control sets to the central program control device.

The data channel contains address lines for influencing the address decoder AD of the control set; an actuation of the control set to receive an input from the data channel only then takes place when coincidence is present between the setting of the address decoder AD and the address information on the data channel. In case of coincidence, the address decoder AD gives off a switching signal for the operation decoder OD via an AND-gate UO which is controlled by an impulse connected to the interrogation pulse input designated "Impulse" in FIG. 1. The acknowledgment multiplexer AM gives off an acknowledgment via the acknowledgment output designated "Acknowledgment" when the control set is ready for receiving operation information. The acknowledgment multiplexer AM is controlled by acknowledgment generators which are partially designed as stores for status signals of electromechanical components of the station.

The actuation of the acknowledgment multiplexer AM results via outputs of the operation decoder OD which, for its part, is under the control influence of the operation information, supplied via an operation input designated "Operation" in FIG. 1.

When the station operates as a dispatching station, the destination coding component DC is actuated via the operation decoder, and outputs the destination information to the data channel. The destination coding is formed by means of destination keys at the station, such a key being diagrammatically indicated at Z.

The index decoder ID can be actuated for an incoming message via the address index input and an output of the address decoder AD. A signal which indicates a specific recipient of several assigned to the same station is selected by the address index input. This indication generally proceeds optically, an indicator lamp being indicated at IL.

The execution of control processes always proceeds such that operation information is output by the microcomputer (which forms the initial point of the data channel) in correspondence with the program while maintaining the coincidence between the setting of the address decoder AD of the desired control set and the address information on the data channel, that the corresponding acknowledgment is received and subsequently the next operation information is output. Thus, the control proceeds in a continuous alternation of operation information and returning acknowledgment signals.

Figure 2:
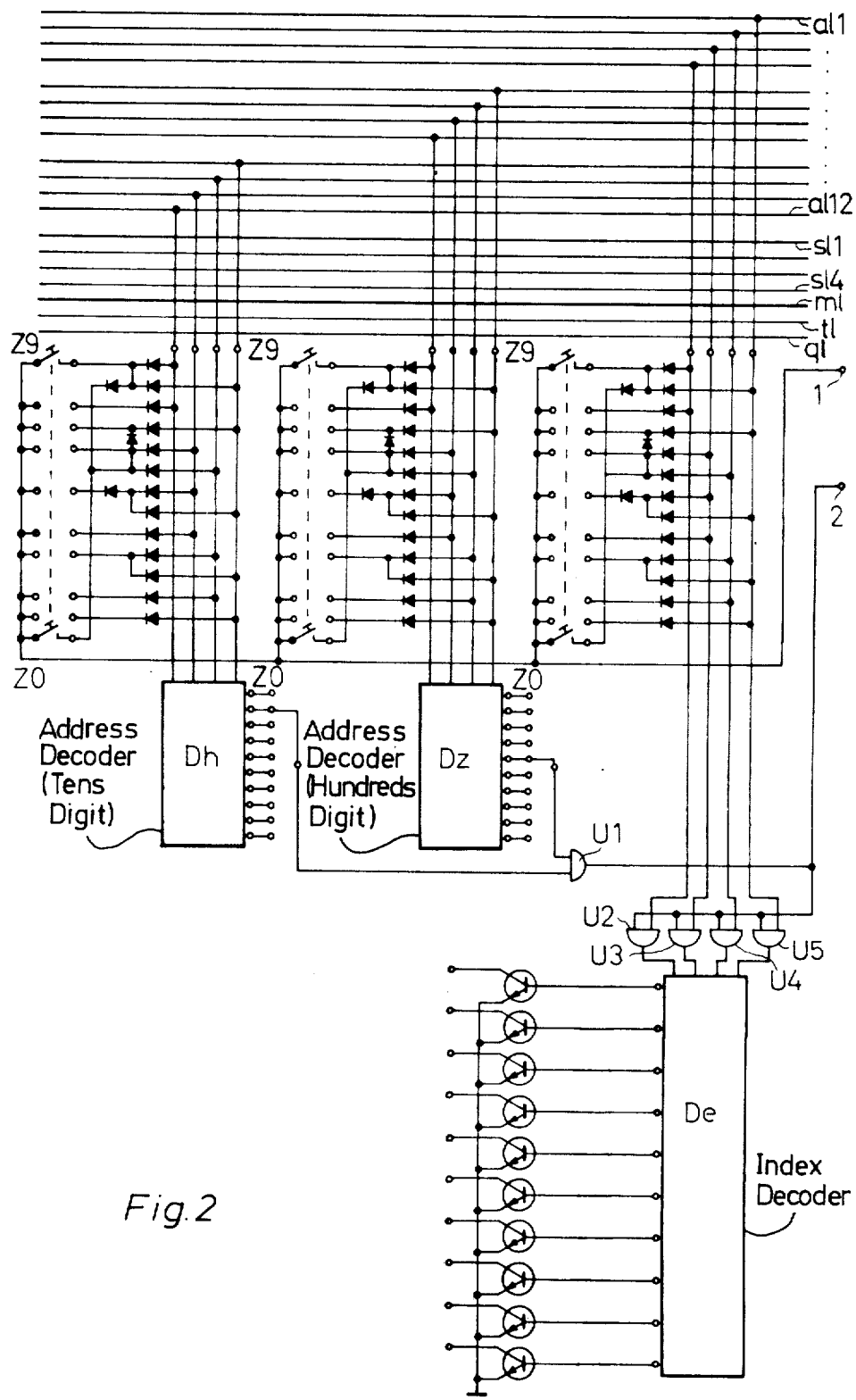
FIGS. 2, 3 and 4 together represent the control set of a combined dispatching and receiver station and the connection of the control set to the lines leading to the central program control device, not illustrated.
Figure 3:
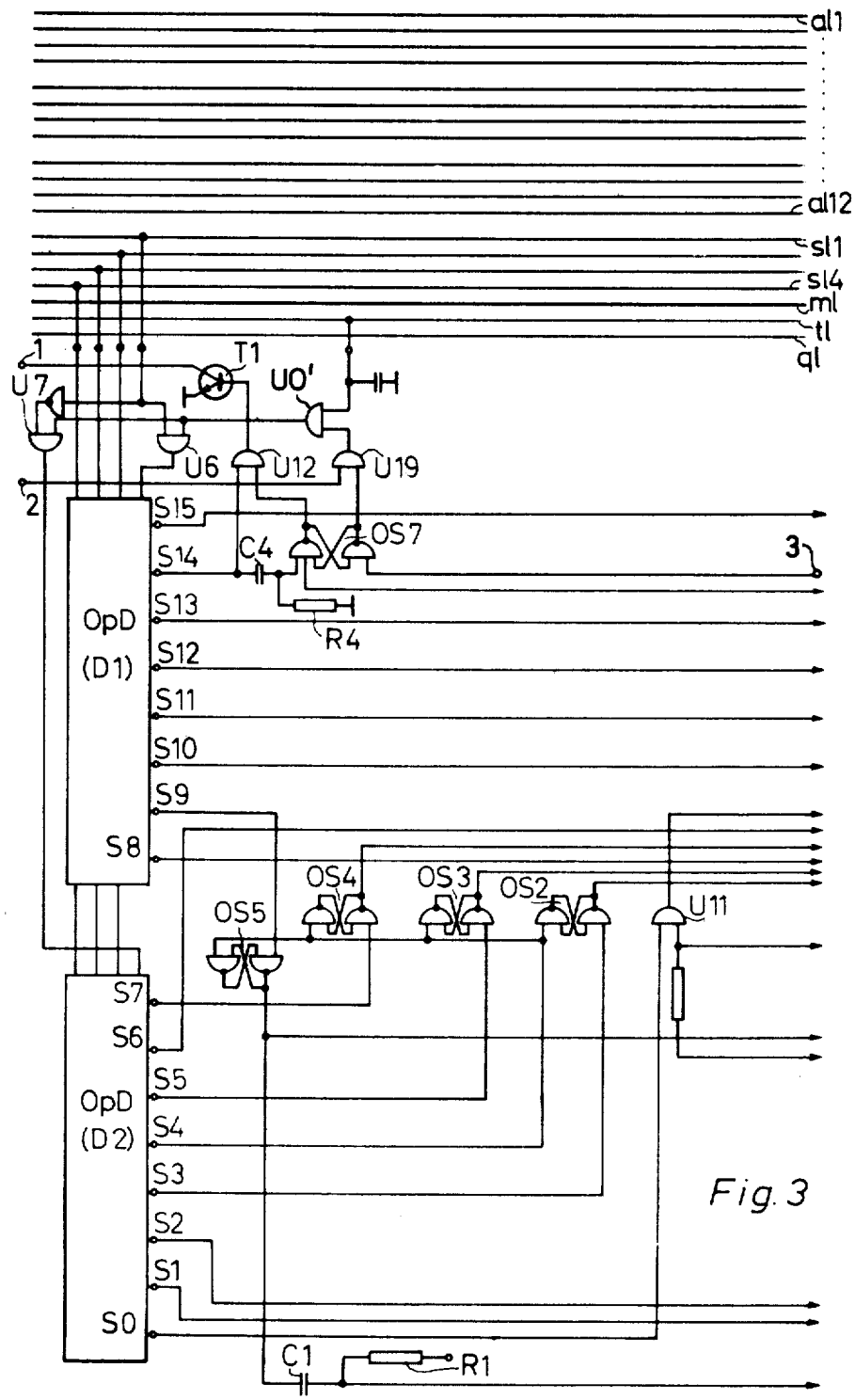
Figure 4:
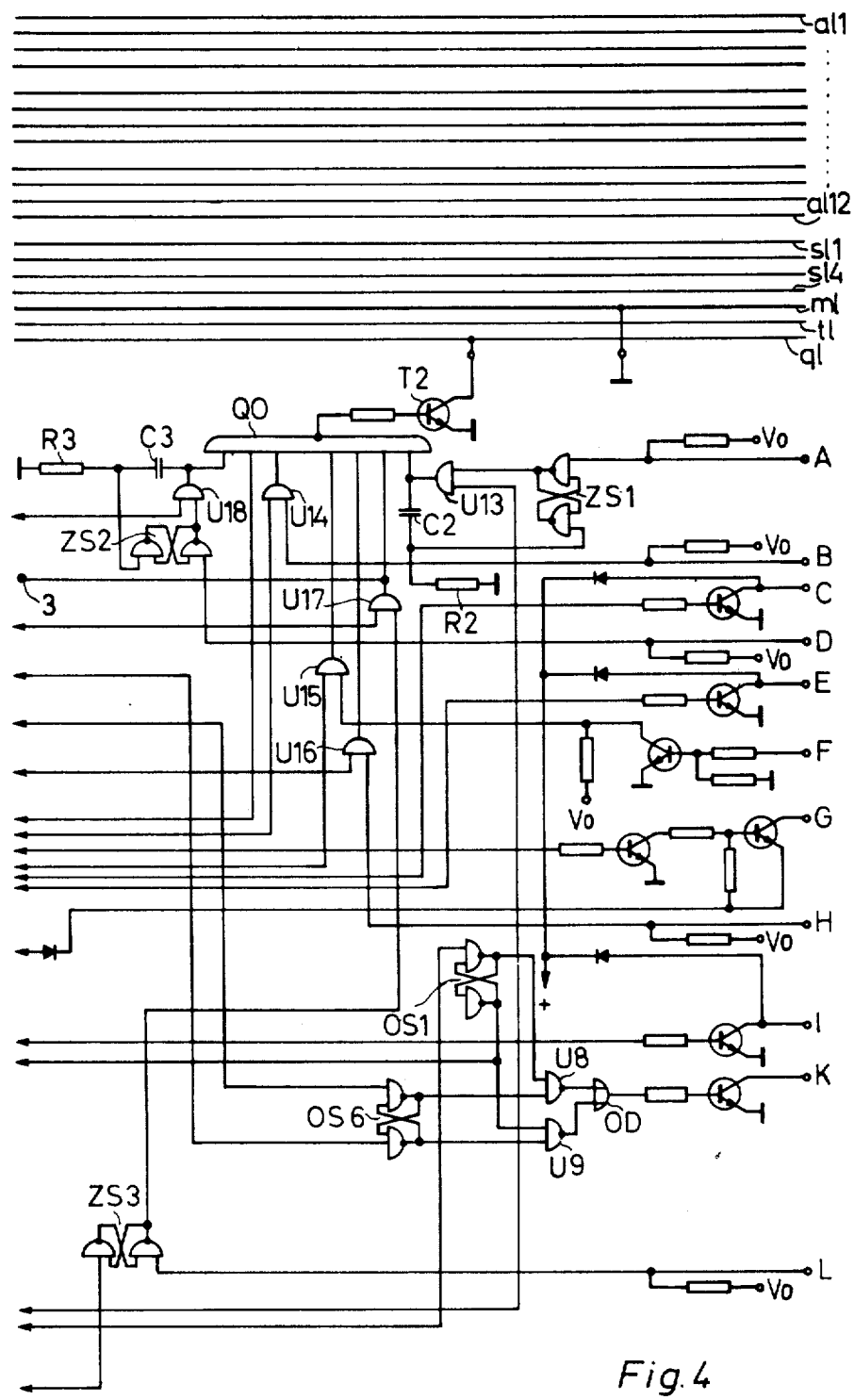

The control set illustrated in FIGS. 2 through 4 relates to a dispatching and receiver station of a pneumatic conveyer system, in which the stations are arranged at the end of the station path segments, respectively branching off from one main tube path. The following electrical and electromechanical components are connected to the signal adjustment circuits of FIG. 4 via the terminals A through L, illustrated in FIG. 4:

A: Travel contact in the range of the shunt. The travel contact is activated when a returning pneumatic conveyer carrier passes by.
B: Shunt terminal contact. The contact is activated when the conveyer shunt is switched.
C: Shunt control. The shunt control—magnet or motor—is activated when the switching signal is present at output C.
D: Travel contact at the valve. Valve and travel contact are arranged in direct proximity to the station situated at the end of a conveyer tube segment.
E: Valve. The valve is switched when a switching potential is present at output E.
F: Acknowledgment contact of the separating slide valve. The station exhibits a slide valve which can enter or exit the interior cross section of the incoming branch conveyer path. When the slide valve has reached its terminal position, the acknowledgment contact is activated.
G: Slide valve control. The drive element of the slide valve is influenced when switching potential is connected to output G.
H: Terminal contact of a dispatching store. For the present combined dispatching and receiver station, a dispatching store is assumed which selectively can enter or exit the interior of the tube segment incoming at the station. The terminal contact is activated in the entered position.
I: Dispatching store control. The dispatching store is rotated into the interior of the conveyer tube segment when a switching potential is connected to output I.
K: Display lamp. The lamp is then switched on when a pneumatic conveyer carrier destined for the station is in transit and thus no shipments can presently be dispatched.
L: Dispatching key. By activating the dispatching key connected to terminal L, a dispatch request of the station for the central program control device is interrogatably stored.

As can be concluded from FIGS. 2 through 4, the data channel, connecting the individual control sets to the central microcomputer, contains an address line comprising twelve wires al 1 through al 12, a control line formed by four wires sl 1 through sl 4 and respectively one impulse line tl, an acknowledgment line ql and a reference potential line ml. The code selected for the address transmission is a binary coded decimal code, so that each decimal digit of three decimal digits of total information can respectively be represented by four conductors of the address line al 1 through al 12. Accordingly, the control set exhibits three address decoder units Dh, Dz and De, which are respectively connected to four conductors of the address line al 1 through al 12 at the input side. The address decoder De is used for the decoding of the unit place of the address information and for the output of a signal for an incoming message. The actual address of the station is thus formed by the hundreds place and the tens place of the address information, and is processed by the address decoders Dh and Dz, whereas the additional address information is merely used for differentiating different operating personnel assigned to the same station.

The generation of destination coding is carried out at the connection lines of the address decoders Dh, Dz and De with the aid of respectively sixteen diodes. Said diodes—in cooperation with ten destination keys Z0 through Z9 provided for each decade—provide for the output of decadically designed destination information in the same binary coded decimal code as the code of the incoming address information.

The signal voltage for outputing the destination information to the address line al 1 through al 12 is not continuously connected to the destination keys Z0 through Z9; rather, said voltage is connected at specific—subsequently to be defined—times via a conductor "1", FIGS. 2 and 3.

When coincidence of the setting of address decoders Dh, Dz with the address information on the address line is present, the AND-gate U1 is connected through, and thus a preparation signal (on conductor "2") is output to the operation decoder OpD, FIG. 3. The inputs of the address or index decoder De are simultaneously prepared via the AND-gates U2 through U5, and thus the later output of defined signals for differentiating from one another several recipients which are assigned to the station.

The operation decoder OpD (FIG. 3) is formed by two decoder levels D1, D2 and is connected to the four conductors sl 1 through sl 4 of the control line and exhibits signal outputs S0 through S15 corresponding to the sixteen different inputs which can be implemented in binary code on the four conductors sl 1 through sl 4. With the aid of AND-gates U6 and U7, the result is obtained that the decoding of the operation information is suppressed when the appertaining output signal (on line "2") of the address decoder Dh, Dz is missing. A total of seven operation signal stores OS1 through OS7 (FIGS. 3 and 4) and three status signal stores ZS1, ZS2, ZS3 (FIG. 4) are connected to the signal outputs S0 through S15, which are essentially connected to the mechanical or electromechanical components of the station connected to the terminals A through L (FIG. 4). The status signal stores ZS1, ZS2, ZS3 are connected to the multiple input OR-gate QO, FIG. 4, (corresponding to the acknowledgment multiplexer AM, FIG. 1), which is connected to the acknowledgment line ql via the switching transistor T2 at the output side.

In the following, the actuation of the operation signal stores OS1 through OS7 and of the status signal stores ZS1 through ZS3 and also the appertaining control processes for introducing the acknowledgment output via the OR-gate QO and for resetting the operation signal stores OS1 through OS7 and the status signal stores ZS1, ZS2, ZS3 are to be explained with the aid of a schematic enumeration of the possible control and acknowledgment operations. The explanation respectively proceeds with the assumption of specific operation information on the control line sl 1 through sl 4 which respectively leads to the activation of a specific one of the outputs S0 through S15 of the operation decoder OpD. For the specific circuit shown, the active output of OpD is switched to a logical zero level.

Operations

Signal at the output S1:

The operation signal store OS1 (FIG. 4) is "set" by this logical zero signal, and thus the station lamp (not illustrated) is switched on via the output terminal K (FIG. 4). In addition to this optical display, the control set—as the most important consequence—is blocked for each additional activity in the system, for example, after recognizing a malfunction in the station. The blocking proceeds by the connection of the storage (reset) output of the operation signal store OS1 to the preparation input of the AND-gate U11 (compare signal at the output S0 when acknowledged). The blocking status of the control set can only be lifted by separate measures—not illustrated—of an operator.

Signal at the output S3:

The output signal sets the operation signal store OS2 (FIG. 3) which is connected to the output E (FIG. 4); the station valve is thereby opened.

Signal at the output S4:

When activated, the signal output S4 conveys the reset signal for the operation signal stores OS2, OS3, OS4 and OS5.

Signal at the output S5:

The operation signal store OS3 is set with this operation signal, and thus switch potential is provided to the output terminal C (FIG. 4) to which the shunt control is connected. Subsequently the shunt shifts into the branching position.

Signal at the output S7:

The switching signal from output S7 sets the operation signals store OS4, which thereby connects switch potential to the output terminal G (FIG. 4) and introduces the opening of the separating slide valve of the station.

Signal at the output S9:

The operation signal store OS5 is set, and thus switching potential is transmitted to the output terminal I (FIG. 4) whereby the drive element of the transmitter store pivots it into alignment with the conveyer tube section incoming to the station.

By controlling the operation signal store OS5 by means of the switching signal at output S4, a reset signal for the status signal store ZS3 is derived from the alteration of the output signal of the operation signal store OS5 via the network R1/C1 (compare signal at the output S13 in acknowledgments).

Signal at the output S11:

The operation signal store OS6 (FIG. 4) is set by this switching signal, and thus a station lamp is switched on via output terminal K (FIG. 4); said lamp indicates the present inclusion of the station into a continuous conveyer process. If the operation signal store OS1 is set, however, (compare switching signal at output S1), the lamp illuminated up to now, expires.

Signal at the output S12:

The operation signal store OS6 is reset by this switching signal, and thus the lamp switched on at output terminal K (FIG. 4) is switched off. If at this point of time the operation signal store OS1 is set, the lamp switched off up to now, lights up.

In order to indicate an operation malfunction within an individual set up (flash signal by alternately setting operation signal stores OS6 and OS1) even in blocked stations, by means of the station lamp connected to output terminal K, an exclusive OR circuit (exclusive OR: U8, U9, OD) is interposed between the outputs of stores OS1 and OS6 and the driving stage for output terminal K.

Signal at the output S14:

This switching signal is used for the transfer of detination information, set with the destination keys Z0 through Z9, FIG. 2, to the address line al 1 through al 12. The switching signal controls through the AND-gate U12 as long as the output of the operation signal store OS7, forming the other input of the AND-gate U12, conveys switching potential; this is the case when previously a dispatch request was recognized by the station (see interrogation of the status signal store ZS3 by means of the switching signal at the output S13 under "acknowledgments". The resetting of the operation signal store OS7 proceeds by differentiation of the switching signal at output S14 via R4/C4. The AND-linkage of the output signal of the operation signal store OS7 and of the switching signal at output S14 thereby replaces the response of the operation decoder OpD via the address decoder (line "2") and the AND-gates U1 and U19. Thereby all twelve wires al 1 through al 12 of the address line are available for the transfer of the destination information, whereby switching potential is connected to the total input line ("1") of the destination keys Z0 through Z9 by means of the transistor T1 which is actuated via the AND-gate U12.

ACKNOWLEDGMENTS

The output of corresponding operation signals is used to transmit the switching status of mechanical or electromechanical components of the station either directly or with the aid of the interrogation of the output signal of the status signal stores ZS1, ZS2, ZS3 to the central program control device. The transfer of acknowledgment signals proceeds by corresponding activation of the operation decoder OpD and evaluation of the respective switching status via the multiple OR-gate QO, FIG. 4.

Switching signal at the output S0:

The electrical availability of the control set is interrogated with the aid of the switching signal at output S0. When the control set was previously blocked by a signal at output S1 (setting of the operation signal store OS1), no output of an acknowledgment signal results.

Switching signal at the output S2:

This switching signal is used for interrogating whether the status signal store ZS1 was set by the actuation of the travel contact connected to the terminal A (FIG. 4). The resetting of the status signal store ZS1 results at the moment of interrogation—controlled via the AND-gate U13—by means of the differentiation network R2/C2.

Switching signal at the output S6:

When an acknowledgment contact, coupled to the pivotable shunt tongue of a station shunt is activated in that the pivotable shunt tongue has reached its terminal position, the interrogation leads to the output of an acknowledgment signal to the acknowledgment line ql via the AND-gate U14.

Switching signal at the output S8:

The interrogation takes place with this switching signal via the AND-gate U15, whether the slide valve of the station has reached the respectively requested terminal position.

Switching signal at the output S10:

The interrogation takes place with this switching signal via the AND-gate U16, to determine whether the transmitter store of the station was pivoted into alignment with the conveyer tube in order to dispatch the carrier and has thus activated the terminal contact connected to the terminal H (FIG. 4).

Switching signal at the output S13:

A dispatch request of the combined dispatching and receiver station is expressed by activating the dispatching key connected to the terminal L (FIG. 4); said dispatching key sets the status signal store ZS3. The interrogation of the dispatch request results via the AND-gate U17 with whose connecting-through the operation signal store OS7 is simultaneously "set" for the preparation of the destination information transmission (see the switching signal at S14 under "Operations").

Switching signal at the output S15:

With the aid of this switching signal one interrogates whether the status signal store ZS2 has been set by activating the travel contact connected to the terminal D (FIG. 4). The resetting of the status signal store ZS2 proceeds at the moment of interrogation by the differentiation network R3/C3 at the output of the AND-gate U18.

By way of example, the operation decoders D1 and D2 may be implemented as monolithic complementary MOS (CMOS) integrated circuits so as to produce a logical zero at the selected one of outputs S0 through S15 when the corresponding code is applied to control lines sl 1 through sl 4. The "central program control device" utilized with the specifically illustrated control set is formed by a microcomputer "Intellec 8080" of Intel Corporation. The programming of the microcomputer in order to carry out the individual control operations is possible for the average person skilled in the art with the aid of the "programming manual for the 8080 microcomputer system" by Intel Corporation. The address decoders Dh, Dz and De and also the two components D1, D2 of the operation decoder OpD are respectively formed by a conventional "BCD to Decimal Decoder". The chip MM54C42/MM74C42, for example, by National Semiconductor can be employed. The OR-gate QO, for example, can be formed by the chip MM54C30/MM74C30 (8-input NAND-gate).

Exemplary Mode of Operation to Transmit a Selected Destination Address

In order to determine whether a control set such as shown in FIGS. 2 through 4 is ready to transmit a destination address, the central control may first output the address of the control set (as determined by the output lines of Dh and Dz, FIG. 2, connected to the inputs of U1). Upon coincidence of the binary coded decimal address on al 5 through al 12 with the decimal setting of the input to U1, the output of U1 is supplied via "2" to one input of gate U19. When store OS7 is "set", the gate U19 transmits an enabling potential to gate U0'. The central control may now place the desired operation code on control lines sl 1 through sl 4 and activate line tl to enable gates U6 and U7. The information bit on line sl 1 then determines whether decoder D1 or D2, FIG. 3, is to be active.

If the control set is ready for transmission of a destination address, store ZS3, FIG. 4, will be "set", and the operation code on control lines sl 1 through sl 4 for output S13, FIG. 3, will switch output S13 to a logical zero level, and cause the return of an acknowledgment signal via AND-gate U17, FIG. 4, OR-gate QO, transistor T2, and acknowledgment line q 1. (The output of AND-gate U17 after release of output S13 is at a logical one level, so that line "3", FIGS. 3 and 4, which leads to the set input of store OS7 is at a logical one level, the set output of store OS7 exhibiting a logical one signal.)

The central control having received an acknowledgement that the control set is ready to transmit a destination address, now places the operation code on control lines sl 1 through sl 4 for selecting output S14. Output S14 is thus driven to a logical zero level, producing a pulse at the reset (pulse) input of store OS7 and resetting store OS7. With the store OS7 reset, when control lines sl 1 through sl 4 are released, output S14 returns to a logical one level, and gate U12 is actuated to turn on transistor T1 and produce the desired transmission of the setting of switches Z0 through Z9, FIG. 2, via line "1", FIGS. 2 and 3.

With the transmission of the destination information, the transmit key connected with terminal L, FIG. 4, is released, allowing resetting of the store ZS3, and providing a logical zero level at line "3", FIGS. 3 and 4. Thus, gate U19 is again enabled to allow the input of further operation codes to the operation decoder OpD.

It will be apparent that many modifications and variations may be effected without departing from the scope of the novel teachings and concepts of the present invention.

A control program for the central program control device is incorporated in Appendix A filed herewith.

```
 1.0000 ;                                ;
 2.0000 ;  FILE   TH.PRE
 3.0000 ;
 4.0000 ;  FILE 'TH.MAINSUB.VERS2'
 5.0000 ;
 6.0000 ;  CONTAINING :   RESTART CODE
 7.0000 ;                 INITIALIZATION
 8.0000 ;                 SLICER, CONTROL BLOCK EXCHANGE
 9.0000 ;                 ALL PROCESSING- AND I/O-SUBROTINES
10.0000 ;
11.0000 ;
12.0000 ;
13.0000 ;
14.0000           ORG      0010H          ;
15.0000 ;                                 ;
16.0000 ;                                 ;
17.0000 PROC0    EQU      0               ; PROC 0
18.0000 PROC1    EQU      1               ; PROC 1
19.0000 PROC2    EQU      2               ; PROC 2
20.0000 PROC3    EQU      3               ; PROC 3
21.0000 PROC4    EQU      4               ; PROC 4
22.0000 PROC5    EQU      5               ; PROC 5
23.0000 PROC6    EQU      6               ; PROC 6
24.0000 PROC7    EQU      7               ; PROC 7
25.0000 PROCM    EQU      8               ; MONITOR
26.0000 ;                                 ;
27.0000 STFLX    EQU      1               ; 0000 0001
28.0000 STFL0    EQU      1               ; 0000 0001
29.0000 STFL1    EQU      2               ; 0000 0010
30.0000 STFL2    EQU      4               ; 0000 0100
31.0000 STFL3    EQU      8               ; 0000 1000
32.0000 STFL4    EQU      16              ; 0001 0000
33.0000 STFL5    EQU      32              ; 0010 0000
34.0000 STFL6    EQU      64              ; 0100 0000
35.0000 STFL7    EQU      128             ; 1000 0000
36.0000 ;                                 ;
37.0000 ZERO     EQU      0               ;
38.0000 EOS      EQU      11111110B       ; END OF SECTION
39.0000 EOL      EQU      11111111B       ; END OF LIST
40.0000 ;                                 ;
41.0000 IDLE     EQU      0FFH            ; FOR DATA BUS
42.0000 ;                                 ;
43.0000 PULSE    EQU      16              ;
44.0000 AVL      EQU      0    +16        ;           P 20
45.0000 BLOCK    EQU      1    +16        ;
46.0000 CNTR     EQU      2    +16        ;
47.0000 OUTLET   EQU      3    +16        ;
48.0000 RESET    EQU      4    +16        ;
49.0000 SWITCH   EQU      5    +16        ;
50.0000 QSWITCH  EQU      6    +16        ;
51.0000 OPEN     EQU      7    +16        ;
52.0000 QSLIDE   EQU      8    +16        ;
53.0000 SHIFT    EQU      9    +16        ;
54.0000 QSTORE   EQU      10   +16        ; A
55.0000 OCP      EQU      11   +16        ; B
56.0000 FREE     EQU      12   +16        ; C
57.0000 SRQ      EQU      13   +16        ; D
58.0000 RDREC    EQU      14   +16        ; E
59.0000 VCNTR    EQU      15   +16        ; F
60.0000 ;                                 ;
61.0000 RECVL    EQU      3    +16        ;
62.0000 SNDVL    EQU      9    +16        ;
63.0000 MCNTR    EQU      2    +16        ;
```

```
 64.0000 ;                          ;
 65.0000 MAVL      EQU   0    +16   ;
 66.0000 MLVLV     EQU   3    +16   ;
 67.0000 CLOSE     EQU   7    +16   ;
 68.0000 ;                          ;
 69.0000 CLEAR     EQU   0    +16   ;        P  30
 70.0000 LVALVE    EQU   1    +16   ;
 71.0000 LSUCK     EQU   2    +16   ;
 72.0000 LBLOW     EQU   3    +16   ;
 73.0000 RELEASE   EQU   4    +16   ;
 74.0000 RVALVE    EQU   5    +16   ;
 75.0000 RSUCK     EQU   6    +16   ;
 76.0000 RBLOW     EQU   7    +16   ;
 77.0000 VALVE     EQU   1    +16   ;
 78.0000 SUCK      EQU   2    +16   ;
 79.0000 BLOW      EQU   3    +16   ;
 80.0000 AC1AVL    EQU   RELEASE    ; AIR CONTR.AVAIL
 81.0000 AC2AVL    EQU   CLEAR      ; AIR CONTR.AVAIL
 82.0000 ;                          ;
 83.0000 TLINES    EQU   50         ; .. * 10 US
 84.0000 TELECTR   EQU   1          ; CCCCCCCCCCCC
 85.0000 ;                          ; PORT ASSIGNMENTS
 86.0000 FUNCP     EQU   8          ; OUTPUT
 87.0000 RESPP     EQU   7          ; INPUT
 88.0000 ADDRP     EQU   10         ; ADDR OUTPUT
 89.0000 IADDRP    EQU   6          ; ADDR INPUT
 90.0000 ARINP     EQU   11         ; ARIND OUTPUT
 91.0000 IARINP    EQU   7          ; ARINDP INPUT
 92.0000 CODEP     EQU   8          ; OUTPUT
 93.0000 PULSP     EQU   8          ; OUTPUT
 94.0000 DLYVP     EQU   10         ; OUTPUT
 95.0000 CTRIP     EQU   7          ; INPUT
 96.0000 CTROP     EQU   11         ; OUTPUT
 97.0000 USERCOMP  EQU   7          ; USER COMMANDS
 98.0000 FRPOP1    EQU   4          ;
 99.0000 FRPOP2    EQU   5          ;
100.0000 FRPOP3    EQU   6          ;
101.0000 TIMEPORT  EQU   CTRIP      ;
102.0000 PHASE     EQU   64         ;
103.0000 #LXID#    EQU   011H       ;
104.0000 SECFRAC   EQU   4          ;
105.0000 ;                          ;
106.0000 ;                          ;
107.0000 TMCNC     EQU   3*SECFRAC  ;
108.0000 TDPST     EQU   3*SECFRAC  ;
109.0000 SCFLIMIT  EQU   4*SECFRAC  ;
110.0000 MINLIMIT  EQU   0          ;
111.0000 TDELAY    EQU   4*SECFRAC  ;
112.0000 TSINK     EQU   1*SECFRAC  ;
113.0000 TDROP     EQU   1*SECFRAC  ;
114.0000 TSLIP     EQU   1*SECFRAC  ;
115.0000 TRELAX    EQU   0*SECFRAC  ;
116.0000 TPAT      EQU   2*TMCNC    ;
117.0000 TPLINK    EQU   SECFRAC/2  ;
118.0000 I         EQU   1          ;
119.0000 ;                          ;
120.0000 RPLOCK    EQU   1          ;
121.0000 ;                          ;
122.0000 NRCLOCK   EQU   9          ;
123.0000 NRPROC    EQU   9          ;
124.0000 VARSIZE   EQU   26         ; 26 BYTES
125.0000 MAXADDR   EQU   03FH       ; MAX UNIT ADDR(FF)
```

```
126.0000 NRJU      EQU  10          ;
127.0000 MSGSIZE   EQU  8           ;
128.0000 NPMSG     EQU  5           ;
129.0000 PROMSIZE  EQU  32          ;
130.0000 ;                          ;
131.0000 RTLVL     EQU  50          ; ROUTINE LEVEL
132.0000 PULSN     EQU  239         ; 1110 1111
133.0000 JUMSK     EQU  00000010B   ; (JU-FLAG SELECT
134.0000 MLMSK     EQU  00000001B   ; MINOR LINE FL
135.0000 DIMSK     EQU  00000100B   ; DIR.FLAG SELECT
136.0000 OLMSK     EQU  00001000B   ; OUTLET FL.SEL
137.0000 VCMSK     EQU  00001010B   ; VLVE CONTR.EXI.
138.0000 ECMSK     EQU  00010000B   ; EXIT CONTROLER
139.0000 SCMSK     EQU  00011010B   ; SECOND CONTROLER
140.0000 COMSK     EQU  00100000B   ; COLL INIT
141.0000 ;                          ;
142.0000 RSPFLAG   EQU  128         ; LINE RESPOND BIT
143.0000 ;                          ; JU STATUS WORD FLAGS:
144.0000 JUENFL    EQU  10000000B   ; 128 ENABLE - DISABLE
145.0000 ;                          ;
146.0000 JUERFL    EQU  01000000B   ;  64 ON ERROR
147.0000 ;                          ;
148.0000 JUSRQFL   EQU  00100000B   ;  32 SEND REQUEST
149.0000 ;                          ;
150.0000 JUDLYFL   EQU  00010000B   ;  16 DELAY
151.0000 ;                          ;
152.0000 JUACCFL   EQU  00001000B   ;   8 ACCEPT
153.0000 ;                          ;
154.0000 JURJTFL   EQU  00000100B   ;   4 REJECT
155.0000 ;                          ;
156.0000 JUORDFL   EQU  00000010B   ;   2 ORDER
157.0000 ;                          ;
158.0000 JUCCLFL   EQU  00000001B   ;   1 CANCEL
159.0000 ;                          ;
160.0000 FSV0      EQU  00000001B   ; ADDR REL#S.GT.D#
161.0000 ;                          ;
162.0000 FSV1      EQU  00000010B   ; DESTIN. DIR.
163.0000 ;                          ;
164.0000 FSV2      EQU  00000100B   ; SOURCE   DIR.
165.0000 ;                          ;
166.0000 FSV3      EQU  00001000B   ; DESTIN. BR.
167.0000 ;                          ;
168.0000 FSV4      EQU  00010000B   ; SOURCE   BR.
169.0000 ;                          ;
170.0000 FSV5      EQU  00100000B   ; DESTIN. JU.
171.0000 ;                          ;
172.0000 FSV6      EQU  01000000B   ; SOURCE   JU.
173.0000 ;                          ;
174.0000 FSV7      EQU  10000000B   ; LINE REL #SAME BRANCH LINE#
175.0000 ;                          ;
176.0000 FSV21     EQU  00000110B   ; DIRECTIONS
177.0000 ;                          ;
178.0000 FSV43     EQU  00011000B   ; BOTH AT BRANCH
179.0000 ;                          ;
180.0000 FSV73     EQU  10001000B   ;
181.0000 ;                          ;
182.0000 F7210     EQU  10000111B   ; =135 Q F MASK
183.0000 ;                          ;
184.0000 ;                          ; Q F ALTERNATIVES
185.0000 QFA1      EQU  4           ; 0XXX X100
186.0000 QFA2      EQU  3           ; 0XXX X010
```

```
187.0000 ;                          ;
188.0000 FCI0       EQU  00000001B;#Q F CONDITION#
189.0000 FCI1       EQU  00000010B;#T F CONDITION#
190.0000 ;                          ;
191.0000 PRIORMSK   EQU  11000000B; PRIORITIES
192.0000 IDLESTAT   EQU  00000001B; IDLE STATUS
193.0000 WAITSTAT   EQU  00000010B; WAIT STATUS
194.0000 TASKSTAT   EQU  00000100B; READY FOR T
195.0000 STATMSK    EQU  00000111B; STATUS MASK
196.0000 ERROR      EQU  00001000B; DEVICE ERROR
197.0000 EMPTY      EQU  00010000B; J U EMPTY IND
198.0000 DESERTED   EQU  00100000B; M L DESERTED "
199.0000 ;                          ;
200.0000 MLSSTAT    EQU  00000010B; SWITCH STATE
201.0000 MLVSTAT    EQU  00000100B; VALVE STATE
202.0000 SPHMSK     EQU  11000000B; SEMAPHORE MASK
203.0000 SPHONE     EQU  01000000B; SEMAPHORE INCR
204.0000 SPHSIGN    EQU  10000000B; SEMAPHORE SIGNIF
205.0000 MAXL       EQU  100       ; MAX LENGTH OF TRANSITION
206.0000 ;               ;JU STATUS FLAGS...
207.0000 VCTRES     EQU  00001000B;VACATE RESERV.
208.0000 RESMSK     EQU  00000111B; J U RESERVATION
209.0000 ;                          ;
210.0000 VIRGIN     EQU  00010000B;
211.0000 ;                          ;
212.0000 #5GTSTW    EQU  5         ;
213.0000 #6RDCLK    EQU  6         ;
214.0000 #7SLICER   EQU  7         ;
215.0000 ;                          ;
216.0000            ORG  0028H     ;
217.0000 REST5:     JMP  GTSTW     ; (RST 5   -- RST #5GTSTW)
218.0000 ;                          ;
219.0000            ORG  0030H     ;
220.0000 REST6:     PUSH H         ; (RST 6   -- RST #6RDCLK)
221.0000            CALL RDCLK     ;
222.0000            POP  H         ;
223.0000            RET            ;
224.0000 ;                          ;
225.0000            ORG  0038H     ;
226.0000 REST7:     POP  H         ; (RST 7   -- RSR #7SLICER)
227.0000            MOV  E,M       ;
228.0000            INX  H         ;
229.0000            MOV  D,M       ;
230.0000            JMP  SLICER    ;
231.0000 ;                          ;
232.0000            ORG  0100H     ;
233.0000 ;                          ;
234.0000 REST0:     NOP            ;
235.0000            LXI  SP,BASE   ;SET STACK POINTE
236.0000            CALL INIT      ;
237.0000            LXI  SP,BASE   ;
238.0000            LXI  H,PROC&   ;
239.0000            MVI  M,8       ; MONITOR
240.0000            CALL MONITOR   ;
241.0000 SYSEXIT:   NOP            ;
242.0000            PUSH PSW       ;
243.0000            LDA  REPORT    ;
244.0000            ORI  08H       ;
245.0000            STA  REPORT    ;
246.0000            POP  PSW       ;
247.0000            CALL DUMP      ;
248.0000            EI             ;
249.0000            HLT            ;
```

```
250.0000 ;                          ;
251.0000 DUMP:      PUSH PSW        ;
252.0000            LDA  REPORT     ;
253.0000            ANI  08H        ;
254.0000            JZ   DUMP4      ;
255.0000            PUSH B          ;
256.0000            PUSH D          ;
257.0000            PUSH H          ;
258.0000            LXI  H,SCRATCH+14 ;
259.0000            MVI  A,7        ;SAVE 7 WORDS FROM STACK
260.0000 DUMP1:     POP  B          ;$SAVE 1 WORD
261.0000            MOV  M,C        ;$
262.0000            DCX  H          ;$
263.0000            MOV  M,B        ;$
264.0000            DCX  H          ;$
265.0000            DCR  A          ;
266.0000            JNZ  DUMP1      ;
267.0000            MVI  A,14       ;  7 * 2 BYTE
268.0000 DUMP2:     DCX  SP         ;
269.0000            DCR  A          ;
270.0000            JNZ  DUMP2      ;
271.0000            XCHG            ;
272.0000            LXI  H,MSGREGH  ; REGISTER HEADING
273.0000            CALL OUTSTRING  ;
274.0000            XCHG            ;
275.0000            MVI  D,14       ;TYPE 7 * 2 BYTES
276.0000 DUMP3:     INX  H          ;
277.0000            MOV  A,M        ;
278.0000            CALL OUTINT     ;
279.0000            CALL BLANK      ;
280.0000            DCR  D          ;
281.0000            JNZ  DUMP3      ;
282.0000            CALL CRLF       ;
283.0000            POP  H          ;
284.0000            POP  D          ;
285.0000            POP  B          ;
286.0000 DUMP4:     POP  PSW        ;
287.0000            RET             ;
288.0000 ;                          ;
289.0000 ;                          ;
290.0000 INIT:      LXI  H,BASE     ;
291.0000            LXI  D,RAMTOP   ;
292.0000 INITCL1:   XRA  A          ;
293.0000            MOV  M,A        ;
294.0000            INX  H          ;
295.0000            CALL CMPDEHLD   ;
296.0000            JNZ  INITCL1    ;
297.0000 ;                          ;
298.0000 INITPC:    LXI  H,PCSA     ;
299.0000            LXI  D,ENTRY    ;
300.0000            MVI  C,8        ;
301.0000 INITPC1:   MOV  M,E        ;
302.0000            INX  H          ;
303.0000            MOV  M,D        ;
304.0000            INX  H          ;
305.0000            DCR  C          ;
306.0000            JNZ  INITPC1    ;
307.0000 ;                          ;
308.0000 INITJU:    LXI  H,JU001    ; JU-TABLE BASE
309.0000            MVI  A,NRJU     ;
310.0000 INITJU1:   MVI  M,JUENFL   ;1000 0000  JU-ST
311.0000            INX  H          ;
312.0000            INX  H          ;
```

```
313.0000              INX   H         ;
314.0000              INX   H         ;
315.0000              DCR   A         ;
316.0000              JNZ   INITJU1   ;
317.0000 ;                            ;
318.0000 INITST:      LXI   H,STTBLE  ;
319.0000              LXI   D,DEMTBLE ;
320.0000 INITST1:     MVI   M,IDLESTAT;
321.0000              INX   H         ;
322.0000              CALL  CMPDEHLD  ;
323.0000              JNZ   INITST1   ;
324.0000 ;                            ;
325.0000 ;                            ;
326.0000 INITM:       LXI   H,MSGTBLE ;
327.0000              LXI   D,MSGTTOP ;
328.0000 INITM1:      MVI   M,VIRGIN  ;
329.0000              INX   H         ;
330.0000              CALL  CMPDEHLD  ;
331.0000              JNZ   INITM1    ;
332.0000 ;                            ;
333.0000 INITVARS:    LXI   H,MSGTBLE ;
334.0000              SHLD  MSGTPTR   ;
335.0000              LXI   H,LINECNT ;
336.0000              MVI   M,PGELNGTH-1 ;
337.0000 ;                            ;
338.0000              MVI   A,1       ;
339.0000              STA   TTYRES    ;
340.0000 ;                            ;
341.0000              STA   ECHOST    ;
342.0000 ;                            ;
343.0000              JMP   NORMLINES ;
344.0000 ;                            ;
345.0000 CMFLAGS:     PUSH  B         ; COMPLEMENT
346.0000              PUSH  PSW       ; CPU-FLAGS;
347.0000              POP   B         ;
348.0000              MOV   A,C       ;
349.0000              CMA             ;
350.0000              MOV   C,A       ;
351.0000              PUSH  B         ;
352.0000              POP   PSW       ;
353.0000              POP   B         ;
354.0000              RET             ;
355.0000 ;                            ;
356.0000 CMPDEHLD:    MOV   A,E       ;
357.0000              CMP   L         ;
358.0000              RNZ             ;
359.0000              MOV   A,D       ;
360.0000              CMP   H         ;
361.0000              RET             ;
362.0000 ;                            ;
363.0000 ; ASYNCHRONOUS PROCESS EXCHANGE
364.0000 ;    SAVE PC OF RECENT PROCESS
365.0000 SLICER:      CALL  TUD       ;
366.0000              LXI   H,PCSA    ; PC SAVE AREA
367.0000              CALL  DISPLP2   ;
368.0000              MOV   M,E       ;
369.0000              INX   H         ;
370.0000              MOV   M,D       ;
371.0000 ;    DATA OF RECENT PROCESS REMAIN LOADED
372.0000 ;    HANDLE ANY SORT OF SRQ DEALING NOW
373.0000              LDA   STFL&     ;
374.0000              MOV   B,A       ;
375.0000              LDA   SYSTEMV   ;
```

```
376.0000            ANA   B        ;
377.0000            JZ    NWSTX    ;
378.0000 ;                          ;
379.0000 ;                          ;
380.0000 ; FILE -TH.ENTREMET-
381.0000 ;                          ;
382.0000 ; THE SUPERBE SOLUTION  -  DO IT VIRTUALLY
383.0000 ;
384.0000 NWST1:      CALL  ALLIDLE  ; $ UPDATE ACTIVE
385.0000            CZ    RSTACTIVE;
386.0000            CNZ   SETACTIVE; CONTINUE PROCESSING
387.0000 NWST2:      JNZ   NWST3    ; IF 'ACTIVE'
388.0000            LXI   H,STFL&  ;
389.0000            LDA   BLINKV   ;
390.0000            ANA   M        ;
391.0000            JNZ   NWSTX    ;
392.0000 NWST3:      LHLD  SRQP&    ;
393.0000            CALL  HLUPDATE ;
394.0000            JNZ   NWST4    ;
395.0000            LHLD  LULB&    ;
396.0000 NWST4:      SHLD  SRQP&    ;
397.0000 ;                          ;
398.0000 QI:         CALL  GTPST    ; BRANCH CONTROL
399.0000            JC    NWSTX    ;
400.0000            JNZ   SIJU     ; STATUS
401.0000 QW:         ANI   WAITSTAT ;
402.0000            JZ    WISO     ; -STATUS=0,0
403.0000            JNZ   ORDT     ; -STATUS=1,0
404.0000 SIJU:       RST   #5GTSTW  ; -STATUS=X,1
405.0000            JNZ   MCHK     ; JU
406.0000 SAVL:       CALL  QAVL     ; SENDER
407.0000 ;                ;         ; AVAILABLE
408.0000            JZ    NWSTX    ;
409.0000 SSRQ:       CALL  QSRQ     ; SEND REQUEST
410.0000 ;                ;         ; AT SENDER
411.0000            JNZ   RDR      ;
412.0000 TRMR:       CALL  READR    ; SAFETY FIRST
413.0000            JMP   NWSTX    ;
414.0000 RDR:        CALL  READR    ; RECEIVER ID
415.0000            JC    NWSTX    ;
416.0000            JZ    RSRQ     ;
417.0000            JMP   SAVE     ;
418.0000 RSRQ:       CALL  FRSRQ    ; -SOME KEY WAS
419.0000            JMP   NWSTX    ; MISSING
420.0000 MCHK:       MVI   A,JUENFL OR JUSRQFL ;AVOID
421.0000            CMP   B        ;SERVING JU UNLESS
422.0000            JNZ   NWSTX    ;PROPER SRQ...
423.0000 TRES:       DCX   H        ; AND
424.0000            MVI   A,RESMSK ; ALIAN
425.0000            ANA   M        ; RESERVATION
426.0000            MOV   B,A      ;
427.0000            LDA   PROC&    ;
428.0000            CMP   B        ;
429.0000            JZ    NWSTX    ; AVOID INSCEST
430.0000 GTR:        INX   H        ; GET RECEIVER
431.0000            INX   H        ; IDENTIFICATION
432.0000            MOV   E,M      ; FROM
433.0000            INX   H        ; MAILING BOX
434.0000            MOV   D,M      ;
435.0000 SAVE:       LXI   H,TEMP&  ; SAVE REC. ID
436.0000            MOV   M,E      ; TO TEMP
437.0000            INX   H        ; STORAGE
```

```
438.0000             MOV   M,D          ;
439.0000  ISPROCEN:  LXI   H,STFL&      ;
440.0000             LDA   PEACEV       ;
441.0000             ANA   M            ;
442.0000             JZ    ESCP         ;
443.0000  REQS:      LHLD  SRQP&        ; LEAVE IF
444.0000             MOV   A,M          ; REC ADDR
445.0000             CMP   E            ; EQUALS SENDER
446.0000             JZ    RSRQ         ;
447.0000  RILL:      CALL  SLULT        ; SEARCH IN LOKAL-
448.0000             JNZ   RFND         ;
449.0000  RIEL:      CALL  SEULT        ; -EXT UNIT LIST
450.0000             JZ    ESCP         ; REPORT NEGATIV
451.0000  RFND:      SHLD  DSQP&        ; SET DEST.POINTER
452.0000             MOV   A,M          ;+++
453.0000             LHLD  SRQP&        ;
454.0000             CALL  DISPLDEM     ;
455.0000             MOV   M,A          ;
456.0000  CJSP:      NOP                ;CALCULATE JOB SPEC CALL DELETED*
457.0000  CHAV:      CALL  CHAVAILQ     ; CHECK AVAILIB.
458.0000  ANYM:      JZ    ESCP         ; OF DEVICES NEGDED
459.0000  DIJU:      LHLD  DSQP&        ;
460.0000             RST   #5GTSTW      ; DESTINATION IS
461.0000             JNZ   SPHT         ; - JU
462.0000             LHLD  SRQP&        ; IF SRC NOT JU .....
463.0000             RST   #5GTSTW      ;
464.0000             JNZ   RIDL         ;
465.0000             CALL  CHONCOT      ; .....MAKE SHURE THERE IS
466.0000             JNZ   ESCP         ;      NO DAMAGE
467.0000             JMP   RIDL         ; (SAVE SITU. - GO ON)
468.0000  SPHT:      DCX   H            ; -JU   CHECK
469.0000             MOV   A,M          ;
470.0000             ANI   SPHSIGN      ; SEMAPHORE
471.0000             JZ    ESCP         ;
472.0000  JUER:      INX   H            ; ESCAPE
473.0000             MVI   A,JUENFL OR JUERFL ;ESCAPE IF
474.0000             ANA   M            ;
475.0000             CPI   JUENFL       ;DISABLE OR ERROR
476.0000             JNZ   ESCP         ;
477.0000  JSRQ:      MVI   A,JUSRQFL    ; FURTHER CHECKING
478.0000             ANA   M            ; IF SEND REQUEST
479.0000             JNZ   SJUT         ;
480.0000             MVI   A,JUENFL     ; DETECT PROGRAM ERROR
481.0000             CMP   M            ;
482.0000             CNZ   DUMP         ;
483.0000  SRMB:      INX   H            ; STORE RECEIVER
484.0000             XCHG               ; IDENTIFICATION
485.0000             LHLD  TEMP&        ; FROM TEMP
486.0000             XCHG               ; STORAGE TO
487.0000             MOV   M,E          ; MAILING BOX
488.0000             INX   H            ;
489.0000             MOV   M,D          ;
490.0000  ISRQ:      DCX   H            ; INDICATE
491.0000             DCX   H            ; SEND
492.0000             MVI   M,JUENFL OR JUSRQFL ; REQUEST
493.0000  RES:       DCX   H            ; STATE
494.0000             MVI   A,RESMSK     ; RESERVATION
495.0000             CMA                ; (PROTECT
496.0000             ANA   M            ; OTHER FLAGS)
497.0000             MOV   B,A          ;
498.0000             LDA   PROC&        ;
499.0000             ORA   B            ;
```

```
500.0000             MOV   M,A         ;
501.0000  NIDL:      LHLD  SRQP&       ; RESET
502.0000             CALL  NOIDLE      ; IDLE STATUS
503.0000             JMP   NWSTX       ;
504.0000  SJUT:      PUSH  H           ; PREVENT SYSTEM FROM DEADLOCK
505.0000             LHLD  SRQP&       ;
506.0000             RST   #5GTSTW     ;
507.0000             POP   H           ;
508.0000             JZ    NWSTX       ; SOURE NON JU-OK
509.0000  OWNR:      DCX   H           ;
510.0000             MVI   A,RESMSK    ; OR IF
511.0000             ANA   M           ; OWN RESERV.-OK
512.0000             MOV   B,A         ;
513.0000             LDA   PROC&       ;
514.0000             CMP   B           ;
515.0000             JZ    NWSTX       ;
516.0000  GREC:      INX   H           ; ELIF
517.0000             INX   H           ; DETECTED
518.0000             MOV   E,M         ; SRQ
519.0000  ISLOKAL:   CALL  SLULT       ;+++
520.0000             JNZ   NWSTX       ;+++
521.0000  IIEX:      CALL  SEULT       ; NEEDS NO JU-OK
522.0000             CZ    SYSEXIT     ;+++
523.0000             MOV   A,M         ; OR IF
524.0000             LHLD  SRQP&       ; IT NEEDS
525.0000             CMP   M           ; DIFFERENT JU-OK
526.0000             JNZ   NWSTX       ; ELSE....
527.0000  IDEL:      RST   #5GTSTW     ; INSURE
528.0000             MVI   A,JUDLYFL   ; MUTUAL
529.0000             ORA   B           ; EXCLUSION
530.0000             MOV   M,A         ; BY DELAYING
531.0000             JMP   NWSTX       ; OWN JOB
532.0000  ;                            ;
533.0000  RIDL:      LHLD  SRQP&       ; RESET
534.0000             CALL  NOIDLE      ; IDLESTATUS
535.0000  GOHD:      RST   #5GTSTW     ; NO JU INVOLVED
536.0000             JNZ   IACC        ;
537.0000  GOTASK:    LHLD  SRQP&       ;
538.0000             CALL  GTPST       ;
539.0000             ORI   TASKSTAT    ;
540.0000             STAX  D           ;
541.0000             JMP   NWSTX       ;
542.0000  IACC:      MVI   A,JUACCFL   ; ACCEPT
543.0000             ORA   B           ; SRQ AT
544.0000             MOV   M,A         ; SOURCE JU
545.0000             LHLD  SRQP&       ;
546.0000             CALL  STWAIT      ; SET WAIT STATUS
547.0000             JMP   NWSTX       ;
548.0000  WISO:      LHLD  SRQP&       ; GET
549.0000             CALL  DISPLDEM    ;
550.0000             MOV   E,M         ; DEMANDED
551.0000  SDFV:      CALL  SLDLT       ;+++
552.0000             CZ    DUMP        ;
553.0000  SDP:       SHLD  DSQP&       ;
554.0000  ACCT:      RST   #5GTSTW     ; BRANCH
555.0000             CZ    DUMP        ;
556.0000             MVI   A,JUACCFL   ; ACCORDING TO
557.0000             ANA   B           ; STATUS FLAGS
558.0000             JNZ   SIJ         ; -ACCEPTED
559.0000  RJTT:      MVI   A,JUERFL    ; ELSE...
560.0000             ORI   JURJTFL     ;
561.0000             ANA   B           ;
562.0000             JNZ   CSR         ; -REJECTED
```

```
563.0000 CSPH:     DCX   H          ; ELSE...
564.0000           MVI   A,SPHSIGN  ;
565.0000           ANA   M          ;
566.0000           INX   H          ;
567.0000           JZ    CSR        ; -DETACHED
568.0000 DELT:     MVI   A,JUDLYFL  ;
569.0000           ANA   B          ; NO ALTERATION
570.0000           JZ    NWSTX      ; +OCCURED
571.0000 CSD:      CALL  ERASEFL    ; RELEASE JU
572.0000           LHLD  SRQP&      ; NORM PROCESSING
573.0000           CALL  NORMSTAT   ; STATUS
574.0000           RST   #5GTSTW    ;
575.0000           JZ    NWSTX      ;
576.0000 IDEY:     MVI   A,JUDLYFL  ; COPY BACK
577.0000           ORA   B          ; DELAY IF
578.0000           MOV   M,A        ; SOURCE JU
579.0000           JMP   NWSTX      ;
580.0000 CSR:      CALL  ERASEFL    ; CLEAN STATUSWORD
581.0000           JMP   ESCP       ;
582.0000 SIJ:      LHLD  SRQP&      ; IF
583.0000           RST   #5GTSTW    ; SENDER -
584.0000           JZ    RDAR       ;
585.0000 INAC:     MVI   A,JUACCFL  ; COPY
586.0000           ORA   B          ; ACCEPT
587.0000           MOV   M,A        ; TO SOURCE JU
588.0000           LHLD  SRQP&      ; SET
589.0000           CALL  STWAIT     ; WAIT STATUS
590.0000           JMP   NWSTX      ;
591.0000 RDAR:     CALL  QSRQ       ; DEVICE RD FF
592.0000           CALL  READR      ; - READ ONCE MORE
593.0000           JNZ   REQD       ; IF SOME KEY MISSING
594.0000           CALL  FRSRQ      ; RESET SRQ...
595.0000           CALL  FRJT       ;
596.0000           JMP   TRYL       ; ...
597.0000 REQD:     PUSH  H          ; ELSE CHECK IF
598.0000           PUSH  D          ; RECEIVER ADDR
599.0000           LHLD  DSQP&      ; IS SAME AS
600.0000           RST   #5GTSTW    ; DEMANDED BEFORE
601.0000           CZ    SYSEXIT    ; +++
602.0000           INX   H          ;
603.0000           MOV   A,M        ; ...FROM MAIL BOX
604.0000           POP   D          ;
605.0000           POP   H          ;
606.0000           CMP   E          ;
607.0000           JZ    ROK        ; SAME KEYS OK
608.0000 TRYL:     CALL  NORMSTAT   ; ...NORM
609.0000           CALL  SICCL      ; SHORT PURGE
610.0000           JMP   NWSTX      ;
611.0000 ROK:      LXI   H,TEMP&    ; SAVE NEWLY
612.0000           MOV   M,E        ; READ VALUES
613.0000           INX   H          ; TO TEMP
614.0000           MOV   M,D        ; STORAGE
615.0000 ARIM:     LHLD  DSQP&      ;
616.0000           PUSH  D          ; XX MAIL
617.0000           RST   #5GTSTW    ; PROBABLY
618.0000           INX   H          ; ALTERED
619.0000           INX   H          ; ARIVAL
620.0000           POP   D          ; XX INDICATION
621.0000           MOV   M,D        ;
622.0000 CJBS:     NOP              ; CALL CJSPE DELETED
623.0000           CALL  CHAVAILQ   ; CHECK AVAILABILITY
624.0000           JNZ   GOTASK     ;
625.0000           JMP   NWSTX      ; NEEDED
```

```
626.0000 ;                             ;
627.0000 ORDT:     RST  #5GTSTW  ; IF
628.0000           MVI  A,JUORDFL; ORDER
629.0000           ANA  B         ; INDICATED...
630.0000           JNZ  GRMB      ; ...
631.0000 CANT:     MVI  A,JUCCLFL; IS
632.0000           ANA  B         ; CANCEL
633.0000           JZ   NWSTX     ; INDICATED-
634.0000 CSAC:     CALL ERASEFL   ; YES...CLEAN S JU STATUS
635.0000 DJTU:     CALL SICCL     ; IF DST=JU THEN
636.0000 ;                             ;
637.0000 SIMP:     LHLD SRQP&     ; SIMPLE
638.0000           CALL NORMSTAT  ; PURGE
639.0000           JMP  NWSTX     ;
640.0000 GRMB:     INX  H         ; ...GET REC.ID
641.0000           MOV  E,M       ; FROM
642.0000           INX  H         ; MAILING BOX
643.0000           MOV  D,M       ;
644.0000           XCHG           ; SAVE REC
645.0000           SHLD TEMP&     ; TO TEMP STOR.
646.0000           LHLD SRQP&     ; RETRIVE DESTINATION
647.0000           CALL DISPLDEM  ;
648.0000           MOV  E,M       ;
649.0000           CALL SLDLT     ;
650.0000           CZ   SYSEXIT   ; +++
651.0000           SHLD DSQP&     ; UPDATE
652.0000           JMP  CJBS      ; DESTIN. POINTER
653.0000 ;                             ;
654.0000 ESCP:     LHLD SRQPR     ; IF
655.0000           RST  #5GTSTW   ; SOURCE JU
656.0000           JZ   RESS      ;
657.0000           MVI  A,JURJTFL; THEN
658.0000           ORA  B         ; STATE
659.0000           MOV  M,A       ; REJECT
660.0000           JMP  NWSTX     ;
661.0000 RESS:     CALL FRSRQ     ; ELSE
662.0000           CALL FRJT      ;
663.0000           CALL NORMSTAT  ; STATUS
664.0000 NWSTX:    NOP            ;
665.0000 ;                             ;
666.0000 ;                             ;
667.0000 ; ....WAKE UP NOW AGAIN  - SINCE ALL'S BEEN DONE
668.0000 ;                             ;
669.0000 ;                             ;
670.0000 ;    POST SLICING.....
671.0000 ;    STEP TO NEXT PROCESS
672.0000 ;         INCREMENT SLICE COUNTER
673.0000 SLICER2:  LXI  H,PROC&   ;
674.0000           MOV  A,M       ;
675.0000           INR  A         ;
676.0000           CPI  PROCM+1   ;
677.0000           JNZ  SLICER20  ;
678.0000           XRA  A         ;
679.0000 SLICER20: MOV  M,A       ;
680.0000 ;   LOAD DATA FOR NEW PROCESS
681.0000 SLICER21: LXI  H,ACBA    ; ACTUAL CB AREA
682.0000           MVI  B,ZERO    ;
683.0000           MVI  C,VARSIZE;
684.0000 SLICER22: CPI  ZERO      ;
685.0000           JZ   SLICER23  ;
686.0000           DCR  A         ;
687.0000           DAD  B         ;
688.0000           JMP  SLICER22  ;
```

```
689.0000 ;   COPY VARIABLES
690.0000 SLICER23: LXI   D,STFL&  ; RUN CONTROL BLOCK
691.0000           CALL  SWAPVARS ;
692.0000 ;   GET NEW PC
693.0000           LXI   H,PCSA   ; PC SAVE AREA
694.0000           CALL  DISPLP2  ;
695.0000           MOV   E,M      ;
696.0000           INX   H        ;
697.0000           MOV   D,M      ;
698.0000           XCHG           ;
699.0000           PCHL           ;
700.0000 ;
701.0000 FRPANAL:  LXI   H,ENFLV  ; COPY USER COMMANDS
702.0000           LDA   SYSTEMV  ;
703.0000           MOV   B,A      ; PORTS
704.0000           CMA            ; TO STATUS AREA
705.0000           ANA   M        ;
706.0000           MOV   C,A      ;
707.0000           IN    USERCOMP ; USER COMMAND PORT
708.0000 ;   SAVE DATA OF RECENT PROCESS
709.0000 ;   COMPUTE BASE
710.0000 SLICER11: LXI   H,ACBA   ; ACTUAL CP AREA
711.0000           LDA   PROC&    ;
712.0000           MVI   B,ZERO   ;
713.0000           MVI   C,VARSIZE;
714.0000 SLICER12: CPI   ZERO     ;
715.0000           JZ    SLICER13 ;
716.0000           DCR   A        ;
717.0000           DAD   B        ;
718.0000           JMP   SLICER12 ;
719.0000 ;   COPY VARIABLES
720.0000 SLICER13: XCHG           ;
721.0000           LXI   H,STFL&  ; RUN CONTROL BLOCK
722.0000           CALL  SWAPVARS ;
723.0000           NOP            ;++++
724.0000           RRC            ; MAK
725.0000           RRC            ; FLAGS
726.0000           RRC            ; CORRESPOND
727.0000           ANA   B        ;
728.0000           ORA   C        ;
729.0000           MOV   M,A      ; UPDATE STATUS
730.0000 ;
731.0000 CPEACE:   LXI   H,SYSTEMV;
732.0000           MOV   A,M      ;
733.0000           INX   H        ;
734.0000           ANA   M        ;
735.0000           MOV   B,A      ;
736.0000           MVI   C,6      ;
737.0000           XRA   A        ;
738.0000 CPEACE1:  INX   H        ;
739.0000           ORA   M        ;
740.0000           DCR   C        ;
741.0000           JNZ   CPEACE1  ;
742.0000           XRA   B        ;
743.0000           ANA   B        ;
744.0000           INX   H        ;
745.0000           MOV   M,A      ;
746.0000 ;
747.0000           LXI   H,ACTIVV ;
748.0000           MOV   A,M      ;
749.0000           CMA            ;
750.0000           OUT   FRPOP1   ;
```

```
751.0000            INX   H          ;
752.0000            INX   H          ;
753.0000            INX   H          ;
754.0000            MOV   A,M        ;
755.0000            CMA              ;
756.0000            OUT   FRPOP3     ;
757.0000            INX   H          ;
758.0000            INX   H          ;
759.0000            MOV   A,M        ;
760.0000            CMA              ;
761.0000            OUT   FRPOP2     ;
762.0000            RET              ;
763.0000            NOP              ;
764.0000            NOP              ;
765.0000            NOP              ;
766.0000            NOP              ;
767.0000            NOP              ;
768.0000            NOP              ;
769.0000            NOP              ;
770.0000            NOP              ;
771.0000            NOP              ;
772.0000            NOP              ;
773.0000            NOP              ;
774.0000            NOP              ;
775.0000            NOP              ;
776.0000            NOP              ;
777.0000            NOP              ;
778.0000            NOP              ;
779.0000            NOP              ;
780.0000            NOP              ;
781.0000            NOP              ;
782.0000            NOP              ;
783.0000            NOP              ;
784.0000            NOP              ;
785.0000            NOP              ;
786.0000            NOP              ;
787.0000            NOP              ;
788.0000            NOP              ;
789.0000            NOP              ;
790.0000            NOP              ;
791.0000            NOP              ;
792.0000            NOP              ;
793.0000            NOP              ;
794.0000            RET              ;
795.0000 ;                           ;
796.0000 ;    COPY "VARSIZE" BYTES OF VARIABLE DATA
797.0000 ;    FROM AREA STARTING AT (HL)
798.0000 ;    TO AREA STARTING AT (DE)
799.0000 SWAPVARS: MVI   A,VARSIZE;
800.0000 ;    ...SWAP (A-REG) BYTES OF DATA
801.0000 COPYBYTE: MOV   B,M        ;
802.0000            XCHG             ;
803.0000            MOV   M,B        ;
804.0000            XCHG             ;
805.0000            INX   H          ;
806.0000            INX   D          ;
807.0000            DCR   A          ;
808.0000            RZ               ;
809.0000            JMP   COPYBYTE   ;
810.0000 ;                           ;
811.0000 NORMLINES: CALL DELYLINE;   SCRATCH (A,B)
812.0000            MVI   A,IDLE     ;
813.0000            OUT   FUNCP      ;
```

```
814.0000              OUT   ADDRP    ;
815.0000              OUT   ARINP    ;
816.0000              CALL  DELYLINE ; SCRATCH (A,B)
817.0000              RET            ;
818.0000 ;                           ;
819.0000 DELYLINE:    MVI   B,TLINES ; (BUS COMMUNIC.)
820.0000              XRA   A        ;
821.0000              INR   A        ;
822.0000              CMP   B        ;
823.0000              JNZ   $-2      ;
824.0000              RET            ;
825.0000 ;                           ;
826.0000 ONPULS:      MOV   A,C      ; GET PENDING COD
827.0000              ANI   PULSN    ;
828.0000              OUT   PULSP    ;
829.0000              RET            ;
830.0000 ;                           ;
831.0000 OFFPULS:     MOV   A,C      ; GET PLANE CODE
832.0000              OUT   PULSP    ;
833.0000              RET            ;
834.0000 ;                           ;
835.0000 HLUPDATE:    MOV   A,M      ;
836.0000              CPI   EOL      ;
837.0000              RZ             ;
838.0000              INX   H        ;
839.0000              MOV   A,M      ;
840.0000              ANI   11B      ;
841.0000              INR   A        ;
842.0000              MOV   C,A      ;
843.0000              XRA   A        ;
844.0000              MOV   B,A      ;
845.0000              DAD   B        ;
846.0000              MOV   A,M      ;
847.0000              CPI   EOL      ;
848.0000              RET            ;
849.0000 ;                           ;
850.0000 ;                           ;
851.0000 #IN#         EQU   0DBH     ;
852.0000 #PUSHH#      EQU   0E5H     ;
853.0000 #POPH#       EQU   0E1H     ;
854.0000 #RET#        EQU   0C9H     ;
855.0000 #ANAM#       EQU   0A6H     ;
856.0000 #LXIH#       EQU   021H     ;
857.0000 ;                           ;
858.0000 MAXREP       EQU   30       ;
859.0000 PRECISION    EQU   10       ;
860.0000 ; SUBROUTINE SCAN VALUE AT INPUT PORT
861.0000 ; SCANNING VALUE PENDING AT THE APPROPRIATE
862.0000 ; INPUT PORT UNTIL BITS INDICATED AT 'INMASK'
863.0000 ; DO NOT VARY WHILE BEEING READ -PRESICION- TIMES
864.0000 ; AT EQUIDISTANCES OF      US UNLESS
865.0000 ; READING HAS BEEN PERFORMED A MAXIMUM OF -MAXREP- TIMES
866.0000 ; THE VALUE HAVING BEEN RECOGNIZED MOST OFTEN
867.0000 ; IS RETURNED AT A REGISTER
868.0000 ; THE CARRY FLAG IS SET IF NO VALUE WAS PRESENT
869.0000 ; DURING ALL THE NECESSARY PERIOD
870.0000 ; IN SUCCESSION  INMASK IS SET TO ITS DEFAULT VALUE 'FFH'
871.0000 ;                           ;
872.0000 INSCAN00:    MVI   A,000H   ; PORT 00
873.0000              JMP   SCANIN   ;
874.0000 INSCAN01:    MVI   A,001H   ; PORT 01
875.0000              JMP   SCANIN   ;
```

```
876.0000 INSCAN02:  MVI   A,002H      ; PORT 02
877.0000            JMP   SCANIN      ;
878.0000 INSCAN03:  MVI   A,003H      ; PORT 03
879.0000            JMP   SCANIN      ;
880.0000 INSCAN04:  MVI   A,004H      ; PORT 04
881.0000            JMP   SCANIN      ;
882.0000 INSCAN05:  MVI   A,005H      ; PORT 05
883.0000            JMP   SCANIN      ;
884.0000 INSCAN06:  MVI   A,006H      ; PORT 06
885.0000            JMP   SCANIN      ;
886.0000 INSCAN07:  MVI   A,007H      ; PORT 07
887.0000            JMP   SCANIN      ;
888.0000 INSCANFF:  MVI   A,0FFH      ; PORT FF
889.0000            JMP   SCANIN      ;
890.0000 ;                            ;
891.0000 ; ADDR OF INPUT PORT AT A REG
892.0000 ;                            ;
893.0000 SCANIN:    PUSH  H           ; SAVE REGISTERS
894.0000            PUSH  D           ;
895.0000            PUSH  B           ;
896.0000            LXI   H,INCODE    ; CREATE INPUT CODE
897.0000            MVI   M,#IN#      ; IN RAM
898.0000            INX   H           ;
899.0000            MOV   M,A         ; REFERABLE TO BY CALL
900.0000            INX   H           ;
901.0000            MVI   M,#PUSHH#   ;
902.0000            INX   H           ;
903.0000            MVI   M,#LXIH#    ;
904.0000            INX   H           ;
905.0000            LXI   D,INMASK    ;
906.0000            MOV   M,E         ;
907.0000            INX   H           ;
908.0000            MOV   M,D         ;
909.0000            INX   H           ;
910.0000            MVI   M,#ANAM#    ;
911.0000            INX   H           ;
912.0000            MVI   M,#POPH#    ;
913.0000            INX   H           ;
914.0000            MVI   M,#RET#     ;
915.0000 SC0:       MVI   H,MAXREP    ; SET UP MAX READ CYCLES
916.0000            MVI   E,PRECISION ; INIT WORST PRECISION
917.0000 SC1:       MVI   L,PRECISION ; LOAD PRECISION
918.0000            CALL  INCODE      ; PRELOAD DATA
919.0000            MOV   B,A         ;
920.0000 SC11:      DCR   H           ; DECR MAX READING
921.0000            CALL  INCODE      ; READ AGAIN
922.0000            CMP   E           ; SAME VALUE ?
923.0000            JNZ   SC3         ; - NO
924.0000            DCR   L           ; - YES
925.0000            JNZ   SC11        ; LOOP
926.0000 SC2:       LXI   H,INMASK    ; NORM INMASK
927.0000            MVI   M,0FFH      ; ALL BITS
928.0000            POP   B           ; RETRIEVE REGISTERS
929.0000            POP   D           ;
930.0000            POP   H           ;
931.0000            RET               ; RETURN (A REG,CY FLAG)
932.0000 SC3:       MOV   A,L         ; PRECISION WAS-
933.0000            CMP   E           ;
934.0000            JNC   SC4         ; - WORSE OR EQUAL
935.0000            MOV   E,L         ; - BETTER
936.0000            MOV   C,B         ; STATE NEW VALUE
```

```
937.0000 SC4:      MOV   A,H         ; RESPECT MAX READING
938.0000           CPI   ZERO        ; CYCLES
939.0000           JNC   SC1         ; SOME CYCLES LEFT
940.0000           MOV   A,C         ; RETURN BEST VALUE FOUND
941.0000           JMP   SC2         ; CY=1 RESULT QUESTIONABLE
942.0000 ;                           ;
943.0000 ;                           ;
944.0000 ;                           ;
945.0000 QUERY:    CALL  REPAF       ;
946.0000           OUT   CODEP       ; SCRATCH (A,B,C,D)
947.0000           MOV   C,A         ; SAVE CODE
948.0000           MOV   A,M         ;
949.0000           OUT   ADDRP       ;
950.0000           CALL  DELYLINE    ; SCRATCH (A,B)
951.0000           CALL  ONPULS      ; SCRATCH (A)
952.0000           CALL  DELYLINE    ; SCRATCH (A,B)
953.0000           IN    RESPP       ;
954.0000           CALL  INSCAN07    ;
955.0000           CMA               ;++++
956.0000           MOV   D,A         ; SAVE RESPONSE
957.0000           CALL  OFFPULS     ; SCRATCH (A)
958.0000           CALL  NORMLINES   ; SCRATCH (A,B)
959.0000           CALL  REPRESP     ;
960.0000           MOV   A,D         ;
961.0000           ANI   RSPFLAG     ;
962.0000           RET               ;
963.0000 ;                           ;
964.0000 FUNCT:    CALL  REPAF       ;
965.0000           OUT   CODEP       ; SCRATCH(A,B,C)
966.0000           MOV   C,A         ; SAVE CODE
967.0000           MOV   A,M         ;
968.0000           OUT   ADDRP       ;
969.0000           CALL  DELYLINE    ; SCRATCH (A,B)
970.0000           CALL  ONPULS      ; SCRATCH (A)
971.0000           CALL  DELYLINE    ; SCRATCH (A,B)
972.0000           CALL  OFFPULS     ; SCRATCH (A)
973.0000           CALL  NORMLINES   ; SCRATCH (A,B)
974.0000           RET               ;
975.0000 ;                           ;
976.0000 REPAF:    MOV   D,A         ;
977.0000           LDA   REPORT      ;
978.0000           ANI   1           ;
979.0000           JZ    REPA1       ;
980.0000           CALL  BLANK       ;
981.0000           MOV   A,M         ;
982.0000           CALL  OUTINT      ;
983.0000           MVI   A,MAKECHAR  ;
984.0000           CALL  OUTCHAR     ;
985.0000           MOV   A,D         ;
986.0000           CALL  OUTDIGIT    ;
987.0000           CALL  BLANK       ;
988.0000 REPA1:    MOV   A,D         ;
989.0000           RET               ;
990.0000 ;                           ;
991.0000 REPRESP:  LDA   REPORT      ;
992.0000           ANI   1           ;
993.0000           RZ                ;
994.0000           MVI   A,QMCHAR    ;
995.0000           CALL  OUTCHAR     ;
996.0000           CALL  BLANK       ;
997.0000           MOV   A,D         ;
998.0000           ANI   RSPFLAG     ;
999.0000           RLC               ;
```

```
1000.0000              CALL OUTDIGIT   ;
1001.0000              CALL BLANK      ;
1002.0000              JMP  BLANK      ;
1003.0000 ;                            ;
1004.0000 DISPLP3:     LDA  PROC&      ;
1005.0000              MOV  C,A        ;
1006.0000              RLC             ;
1007.0000              ADD  C          ;
1008.0000              JMP  DISPLPA    ;
1009.0000 DISPLP2:     LDA  PROC&      ;
1010.0000              RLC             ;
1011.0000 DISPLPA:     MOV  C,A        ;
1012.0000              XRA  A          ;
1013.0000              MOV  B,A        ;
1014.0000              DAD  B          ;
1015.0000              RET             ;
1016.0000 ; GLOBAL ABSOLUTE CLOCK -RANGE=24H,
1017.0000 ;                           -CYCLE=1SEC/SECFRAC
1018.0000 ;                           -ACCESS=SET/READ
1019.0000 ;                           -SYNCHRONIZATION:
1020.0000 ;                              STEP ON 1 CYCLE PER EDGE OF
1021.0000 ;                              TRIG SIGNAL AT TIMEP.PHASE
1022.0000 ; A NR OF INDEPENDENT RELATIVE CLOCKS
1023.0000 ;                           -RANGE,CYCLE=255MIN,1SEC/SECFRAC
1024.0000 ;                           -ACCESS=SET VALUE/READ IF ZERO
1025.0000 ;                           -SYNCHRONIZATION:
1026.0000 ;                           -COUNT DOWN 1 CYCLE EVERY TIME
1027.0000 ;                              G A C   IS BEING INCREMENTED
1028.0000 ;
1029.0000 ; TIME UPDATEING - SYNCRONIZE SOFTWARE CLOCKS
1030.0000 ;                    WITH TRIG PULSE FROM HARDWARE
1031.0000 ;                    TUD SHOULD BE REFERED TO PERIODICALY
1032.0000 ;                    AT DISTANCES OF LESSEQUAL 1SEC/SECFRAC
1033.0000 ;                  - MODIFIES NONE
1034.0000 ;                  - DELAY: >=32US NET (...200)
1035.0000 TUD:          PUSH PSW       ;
1036.0000              PUSH H          ;
1037.0000              LXI  H,TIMEPHS  ;
1038.0000              IN   TIMEPORT   ;
1039.0000              ANI  PHASE      ;
1040.0000              CMP  M          ;
1041.0000              JZ   TUD1       ;
1042.0000              MOV  M,A        ;
1043.0000              PUSH D          ;
1044.0000              PUSH B          ;
1045.0000              CALL TMESTP     ;
1046.0000              POP  B          ;
1047.0000              POP  D          ;
1048.0000 TUD1:         POP  H         ;
1049.0000              POP  PSW        ;
1050.0000              RET             ;
1051.0000 ;
1052.0000 TMESTP:       CALL FRPANAL   ;
1053.0000              MVI  E,ZERO     ;
1054.0000              MVI  D,NRCLOCK  ;
1055.0000              LXI  H,RELCLKS  ;
1056.0000 TMESTP1:      CALL DCRCLCK   ;
1057.0000              INX  H          ;
1058.0000              INX  H          ;
1059.0000              DCR  D          ;
1060.0000              JNZ  TMESTP1    ;
1061.0000 ;
1062.0000              LXI  H,TIMESF   ;
```

```
1063.0000              INR   M           ;
1064.0000              MOV   A,M         ;
1065.0000              CPI   60*SECFRAC  ;
1066.0000              RNZ               ;
1067.0000              MOV   M,E         ;
1068.0000 ;
1069.0000              INX   H           ;
1070.0000              INR   M           ;
1071.0000              MOV   A,M         ;
1072.0000              CPI   60          ;
1073.0000              RNZ               ;
1074.0000              MOV   M,E         ;
1075.0000 ;
1076.0000              INX   H           ;
1077.0000              INR   M           ;
1078.0000              MOV   A,M         ;
1079.0000              CPI   24          ;
1080.0000              RNZ               ;
1081.0000              MOV   M,E         ;
1082.0000              RET               ;
1083.0000 ;
1084.0000 DCRCLCK:     MOV   A,M         ;
1085.0000              CMP   E           ;
1086.0000              JZ    DCRCLCK1    ;
1087.0000              DCR   M           ;
1088.0000              RET               ;
1089.0000 DCRCLCK1:    INX   H           ;
1090.0000              MOV   A,M         ;
1091.0000              DCX   H           ;
1092.0000              CMP   E           ;
1093.0000              RZ                ;
1094.0000              INX   H           ;
1095.0000              DCR   M           ;
1096.0000              DCX   H           ;
1097.0000              MVI   M,60*SECFRAC-1 ;
1098.0000              RET               ;
1099.0000 ;
1100.0000 GTRCLCK:     LXI   H,RELCLKS   ;
1101.0000              JMP   DISPLP2     ;
1102.0000 ;
1103.0000 STLIMIT:     DB    #LXID#,SCFLIMIT,MINLIMIT ;
1104.0000              JMP   STCLK       ;
1105.0000 ;
1106.0000 STMCNC:      MVI   E,TMCNC     ;
1107.0000 ;
1108.0000 STCLKSF:     MVI   D,0         ;
1109.0000 STCLK:       CALL  GTRCLCK     ;
1110.0000              MOV   M,E         ;
1111.0000              INX   H           ;
1112.0000              MOV   M,D         ;
1113.0000              RET               ;
1114.0000 ;
1115.0000 RDCLK:       CALL  GTRCLCK     ;
1116.0000              MOV   A,M         ;
1117.0000              INX   H           ;
1118.0000              ORA   M           ;
1119.0000              RET               ;
1120.0000 ;
1121.0000 SETTIME:     CALL  INDEC       ;
1122.0000              MOV   D,A         ;
1123.0000              CALL  INDEC       ;
1124.0000              MOV   E,A         ;
```

```
1125.0000             CALL  INDEC    ;
1126.0000             RLC            ;
1127.0000             RLC            ;
1128.0000             LXI   H,TIMESF ;
1129.0000             MOV   M,A      ;
1130.0000             INX   H        ;
1131.0000             MOV   M,E      ;
1132.0000             INX   H        ;
1133.0000             MOV   M,D      ;
1134.0000             JMP   BPRTTIME ;
1135.0000   ;                        ;
1136.0000 BPRTTIME:   CALL  BLANKS   ;
1137.0000 PRTTIME:    PUSH  D        ;
1138.0000             PUSH  H        ;
1139.0000             LXI   H,TIMESF ;
1140.0000             MOV   E,M      ;
1141.0000             INX   H        ;
1142.0000             MOV   D,M      ;
1143.0000             INX   H        ;
1144.0000             MOV   A,M      ;
1145.0000             CALL  OUTDEC   ;
1146.0000             CALL  COLON    ;
1147.0000             MOV   A,D      ;
1148.0000             CALL  OUTDEC   ;
1149.0000             CALL  COLON    ;
1150.0000             MOV   A,E      ;
1151.0000             RRC            ;
1152.0000             RRC            ;
1153.0000             ANI   03FH     ;
1154.0000             CALL  OUTDEC   ;
1155.0000             POP   H        ;
1156.0000             POP   D        ;
1157.0000             JMP   BLANK    ;
1158.0000   ;                        ;
1159.0000 COPYTIME:   CALL  DISPLP3  ;
1160.0000             XCHG           ;
1161.0000             LXI   H,TIMESF ;
1162.0000             MVI   A,3      ;
1163.0000             JMP   COPYBYTE ;
1164.0000   ;                        ;
1165.0000 TASKREP:    CALL  CRLF     ;
1166.0000             CALL  SLASH    ;
1167.0000             LDA   PROC&    ;
1168.0000             INR   A        ;
1169.0000             CALL  OUTDIGIT ;
1170.0000             CALL  BLANKS   ;
1171.0000             LXI   H,BUFFERA;
1172.0000             CALL  DISPLP3  ;
1173.0000             MOV   E,M      ;
1174.0000             INX   H        ;
1175.0000             MOV   D,M      ;
1176.0000             INX   H        ;
1177.0000             MOV   A,M      ;
1178.0000             CALL  OUTDEC   ;
1179.0000             CALL  COLON    ;
1180.0000             MOV   A,D      ;
1181.0000             CALL  OUTDEC   ;
1182.0000             CALL  COLON    ;
1183.0000             MOV   A,E      ;
1184.0000             RRC            ;
1185.0000             RRC            ;
1186.0000             ANI   03FH     ;
```

```
1187.0000                CALL OUTDEC     ;
1188.0000                CALL BLANKS     ;
1189.0000                LHLD SRCP&      ;
1190.0000                MOV  A,M        ;
1191.0000                CALL OUTINT     ;
1192.0000                RST  #5GTSTW    ;
1193.0000                CNZ  ASTERISK   ;
1194.0000                LXI  H,MSGTO    ;
1195.0000                CALL OUTSTRING  ;
1196.0000                LHLD DSTP&      ;
1197.0000                MOV  A,M        ;
1198.0000                CALL OUTINT     ;
1199.0000                RST  #5GTSTW    ;
1200.0000                JNZ  TASKREP2   ;
1201.0000                LHLD SRCP&      ;
1202.0000                RST  #5GTSTW    ;
1203.0000                JNZ  TASKREP1   ;
1204.0000                CALL DISPLDEM   ;
1205.0000                JMP  TASKREP3   ;
1206.0000  TASKREP1:     INX  H          ;
1207.0000                INX  H          ;
1208.0000                JMP  TASKREP3   ;
1209.0000  TASKREP2:     CALL ASTERISK   ;
1210.0000                CALL BLANK      ;
1211.0000                INX  H          ;
1212.0000                MOV  A,M        ;
1213.0000                CALL OUTINT     ;
1214.0000                INX  H          ;
1215.0000  TASKREP3:     CALL PERIOD     ;
1216.0000                MOV  A,M        ;
1217.0000                CALL OUTDIGIT   ;
1218.0000                CALL BLANKS     ;
1219.0000                LXI  H,BUFFERB  ;
1220.0000                CALL DISPLP3    ;
1221.0000                MOV  E,M        ;
1222.0000                INX  H          ;
1223.0000                MOV  D,M        ;
1224.0000                INX  H          ;
1225.0000                MOV  A,M        ;
1226.0000                CALL OUTDEC     ;
1227.0000                CALL COLON      ;
1228.0000                MOV  A,D        ;
1229.0000                CALL OUTDEC     ;
1230.0000                CALL COLON      ;
1231.0000                MOV  A,E        ;
1232.0000                RRC             ;
1233.0000                RRC             ;
1234.0000                ANI  03FH       ;
1235.0000                CALL OUTDEC     ;
1236.0000                JMP  BLANKS     ;
1237.0000  ;                             ;
1238.0000  LDMH:         MOV  E,M        ;
1239.0000                INX  H          ;
1240.0000                MOV  D,M        ;
1241.0000                INX  H          ;
1242.0000                RET             ;
1243.0000  ;
1244.0000  SKIPSP:       CALL LDMH       ;
1245.0000                MOV  A,E        ;
1246.0000                ORA  D          ;
1247.0000                JZ   SKIPSP     ;
1248.0000                DCX  H          ;
1249.0000                DCX  H          ;
```

```
1250.0000              RET               ;
1251.0000  GETWORD:    CALL  LDMH        ;
1252.0000              MOV   A,E         ;
1253.0000              CMP   D           ;
1254.0000              RNZ               ;
1255.0000              CPI   EOL         ;
1256.0000              RET               ;
1257.0000  ;                             ;
1258.0000  GTSTW:      INX   H           ;         S  60
1259.0000              MOV   A,M         ;
1260.0000              DCX   H           ;
1261.0000              MOV   B,A         ; SAVE FLAGS
1262.0000              ANI   JUMSK       ;
1263.0000              RZ                ;
1264.0000              INX   H           ;
1265.0000              MOV   A,B         ;
1266.0000              ANI   MLMSK       ;
1267.0000              JZ    $+4         ;
1268.0000              INX   H           ;
1269.0000              INX   H           ;
1270.0000              MOV   E,M         ;
1271.0000              INX   H           ;
1272.0000              MOV   D,M         ;
1273.0000              XCHG              ;
1274.0000              INR   A           ;
1275.0000              MOV   B,M         ; STATUS WORD
1276.0000              MOV   A,B         ;
1277.0000              RET               ;
1278.0000  ;                             ;
1279.0000  ; ERASE JU STATUS FLAGS PROTECTING ENABLE,ERROR
1280.0000  ERASEFL:    MVI   A,JUENFL OR JUERFL ;
1281.0000              ANA   M           ;
1282.0000              MOV   M,A         ;
1283.0000              RET               ;
1284.0000  ;                             ;
1285.0000  ;           ; GET PROCESSING STATUS BYTE
1286.0000  ;           ; TO B,A REG     MODIFIES ALL
1287.0000  ;           ; LIST ENTRY ADDR AT HL, REMAINING
1288.0000  ;           ; STATUS BYTE ADDR ABS AT DE
1289.0000  ;           ; ZERO=1 IF NOT IDLE, CY=1 IF TASK
1290.0000  GTPST:      PUSH  H           ; SAVE HL
1291.0000              CALL  DISPLST     ;
1292.0000              MOV   A,M         ; LOAD STATUS BYTE
1293.0000              MOV   B,A         ;
1294.0000              ANI   IDLESTAT    ;
1295.0000              MOV   A,B         ;
1296.0000              PUSH  PSW         ;
1297.0000              ANI   TASKSTAT    ;
1298.0000              MOV   A,B         ;
1299.0000              XCHG              ;
1300.0000              JZ    GTPST1      ;
1301.0000              POP   PSW         ;
1302.0000              STC               ;
1303.0000              POP   H           ;
1304.0000              RET               ;
1305.0000  GTPST1:     POP   PSW         ;
1306.0000              POP   H           ; RETRIEVE HL
1307.0000              RET               ;
1308.0000  ;                             ;
1309.0000  ;                             ;
1310.0000  LUDOING:    LHLD  LULB&       ;
```

```
1311.0000 LUDOING1: MOV    A,M        ;
1312.0000           CPI    EOL        ;
1313.0000           RZ                ;
1314.0000           INX    H          ;
1315.0000           MVI    A,JUMSK    ;
1316.0000           ANA    M          ;
1317.0000           DCX    H          ;
1318.0000           JNZ    $+7        ;
1319.0000           MOV    A,E        ;
1320.0000           CALL   FUNCT      ;
1321.0000           CALL   HLUPDATE   ;
1322.0000           JMP    LUDOING1   ;
1323.0000 ;                           ;
1324.0000 LUOCP:    MVI    E,OCP      ;
1325.0000           JMP    LUDOING    ;
1326.0000 ;                           ;
1327.0000 LUFREE:   MVI    E,FREE     ;
1328.0000           JMP    LUDOING    ;
1329.0000 ;                           ;
1330.0000 LUOPEN:   MVI    E,OPEN     ;
1331.0000           JMP    LUDOING    ;
1332.0000 ;                           ;
1333.0000 LURST:    LHLD   LULB&      ;
1334.0000 LURST1:   MOV    A,M        ;
1335.0000           CPI    EOL        ;
1336.0000           RZ                ;
1337.0000           CALL   NTRUNIT    ;
1338.0000           CALL   HLUPDATE   ;
1339.0000           JMP    LURST1     ;
1340.0000 ;                           ;
1341.0000 ;         ;ALL SLIDES CLOSED    MOD ALL
1342.0000 ;         ;ZERO := 1 IF SOME SLIDE OPEN
1343.0000 ASC:      LHLD   LULB&      ;
1344.0000 ASC0:     MOV    A,M        ;
1345.0000           CPI    EOL        ;
1346.0000           JZ     CMFLAGS    ;
1347.0000           CALL   FRESET     ;
1348.0000           CALL   QQSLIDE    ;
1349.0000           JNZ    CMFLAGS    ;
1350.0000           CALL   HLUPDATE   ;
1351.0000           JMP    ASC0       ;
1352.0000 ;                           ;
1353.0000 READR:    CALL   SUBREADR   ;
1354.0000           PUSH   PSW        ;
1355.0000           LDA    RUNMODE    ;
1356.0000           ANI    RMLOCK     ;
1357.0000           JZ     READR1     ;
1358.0000           MOV    A,E        ;
1359.0000           CMP    M          ;
1360.0000           JZ     READR2     ;
1361.0000 READR1:   POP    PSW        ;
1362.0000           STC               ;
1363.0000           CMC               ;
1364.0000           RET               ;
1365.0000 READR2:   POP    PSW        ;
1366.0000           STC               ;
1367.0000           RET               ;
1368.0000 ;                           ; ADDRESS
1369.0000 SUBREADR: MVI    A,IDLE     ; & AKIND
1370.0000           OUT    ADDRP      ; TO (D,E)
1371.0000           OUT    ARINP      ;
1372.0000           MVI    A,RDREC    ;
1373.0000           CALL   REPAF      ;
```

```
1374.0000              OUT   CODEP    ;
1375.0000              MOV   C,A      ;
1376.0000              CALL  DELYLINE ;
1377.0000              CALL  ONPULS   ;
1378.0000              CALL  DELYLINE ;
1379.0000              MVI   A,IADDRP ;
1380.0000              CALL  SCANIN   ;
1381.0000              CMA            ;++++
1382.0000              MOV   E,A      ; ADDRESS
1383.0000              MVI   A,IARINP ;
1384.0000              CALL  SCANIN   ;
1385.0000              CMA            ;++++
1386.0000              ANI   00001111B; NO LITTER
1387.0000              MOV   D,A      ; ARIVALIND
1388.0000              CALL  OFFPULS  ;
1389.0000              CALL  NORMLINES;
1390.0000              CALL  REPREADR ;
1391.0000              MVI   B,0F0H   ; KEY1-MASK
1392.0000              MVI   C,0FH    ; KEY2,3-MASK
1393.0000              MOV   A,B      ;
1394.0000              ANA   E        ;CHECK KEY 1
1395.0000              RZ             ;KEY 1 MISSING
1396.0000              CMP   B        ;
1397.0000              JNZ   $+6      ;KEY 1 OK
1398.0000              MOV   A,E      ;
1399.0000              ANA   C        ;CONVERT
1400.0000              MOV   E,A      ;
1401.0000              MOV   A,C      ;CHECK KEY 2
1402.0000              ANA   E        ;
1403.0000              RZ             ;KEY 2 MISSING
1404.0000              CMP   C        ;
1405.0000              JNZ   $+6      ;KEY 2 OK
1406.0000              MOV   A,E      ;
1407.0000              ANA   B        ;CONVERT
1408.0000              MOV   E,A      ;
1409.0000              MOV   A,C      ;CHECK KEY 3
1410.0000              ANA   D        ;
1411.0000              RZ             ;KEY 3 MISSING
1412.0000              CMP   C        ;
1413.0000              RNZ            ;KEY 3 OK
1414.0000              MOV   A,D      ;
1415.0000              ANA   B        ;CONVERT
1416.0000              MOV   D,A      ;
1417.0000              INR   A        ;
1418.0000              RET            ;
1419.0000      ;
1420.0000  REPREADR: LDA  REPORT      ;
1421.0000              ANI   1        ;
1422.0000              RZ             ;
1423.0000              CALL  BLANK    ;
1424.0000              MOV   A,E      ;
1425.0000              CALL  OUTINT   ;
1426.0000              CALL  PERIOD   ;
1427.0000              MOV   A,D      ;
1428.0000              CALL  OUTDIGIT ;
1429.0000              JMP   BLANK    ;
1430.0000      ;                      ;SEARCH UNIT IN LOCALUNIT
1431.0000  SLULT:    LHLD  LULB&      ; E=UNITK
1432.0000  SLULT1:   MVI   A,EOL      ;
1433.0000              CMP   M        ;
1434.0000              RZ             ;ZERO=1, UNITK NOT FOUND
1435.0000              INX   H        ; % AVOID
1436.0000              MVI   A,JUMSK  ; % RECOGN.
```

```
1437.0000             ANA   M            ; % A JU AS
1438.0000             DCX   H            ; % DESTINATION
1439.0000             JNZ   $+8          ; %
1440.0000             MOV   A,E          ;
1441.0000             CMP   M            ;
1442.0000             JZ    $+9          ;
1443.0000             CALL  HLUPDATE     ;
1444.0000             JMP   SLULT1       ;
1445.0000             SHLD  RECUNIT      ; STATE REC FOR --CHONCOT--
1446.0000             INR   A            ; ZERO=0
1447.0000             RET                ; HL = ADDRESS OF ENTRY
1448.0000 ;                              ; SEARCH IN EXT UNIT LIST
1449.0000 ;                              ;
1450.0000 SLDLT:      LHLD  LULB&        ;
1451.0000 SLDLT1:     MVI   A,EOL        ;
1452.0000             CMP   M            ;
1453.0000             RZ                 ;
1454.0000             MOV   A,E          ;
1455.0000             CMP   M            ;
1456.0000             JNZ   SLDLT2       ;
1457.0000             INR   A            ; CLEAR ZERO
1458.0000             RET                ;
1459.0000 SLDLT2:     CALL  HLUPDATE     ;
1460.0000             JMP   SLDLT1       ;
1461.0000 ;                              ;
1462.0000 ;
1463.0000 ; NEWLY DEFINED SUBROUTINE
1464.0000 ; -- SEARCH EXTENDED UNIT --
1465.0000 ; REFERING TO RECURSIVE DEFINED SUBROUTINE
1466.0000 ; -- SEREC -- TO FIND THE
1467.0000 ; SHORTEST POSSIBLE TRANSITION AVAILABLE
1468.0000 ; VIA JUNCTION UNITS
1469.0000 ;                              ;
1470.0000 SEULT:      MOV   A,E          ;
1471.0000             STA   TEMPU        ; SET UP UNIT WANTED
1472.0000             LHLD  LULB&        ; SAVE WORD
1473.0000             SHLD  TEMPX        ;
1474.0000             LDA   ENFLV        ; STATE 'ALREADY INVESTIGATED'
1475.0000             CMA                ; FOR CONSTRUCTIONS
1476.0000             LXI   H,STFL&      ; DISABLED
1477.0000             ORA   M            ; AND THIS CONSTRUCTION
1478.0000             STA   TEMPV        ; AT GLOBAL -V-
1479.0000             CALL  SLULT        ; STEP TO TOP
1480.0000             RNZ                ; LOKAL UNIT LIST
1481.0000 SEU1:       INX   H            ; BASE OF SUPPLEMENT
1482.0000             MOV   A,M          ; $ SKIP
1483.0000             INX   H            ; $ SPACES LEFT FOR EXTENSIONS
1484.0000             ORA   M            ; $ REPRESENTED BY
1485.0000             JZ    SEU1         ; $ WORD 0000H
1486.0000             DCX   H            ; $
1487.0000 SEU2:       MVI   A,MAXL       ; PRESET LENGTH = WORST
1488.0000             STA   TEMPL        ;
1489.0000 SEU3:       MOV   A,M          ; $ DETECT TOP OF SUPPL.
1490.0000             INX   H            ; $ INDICATED BY
1491.0000             CMP   M            ; $ WORD FFFFH
1492.0000             DCX   H            ; $
1493.0000             JNZ   SEU5         ; $
1494.0000             CPI   EOL          ; $
1495.0000             JNZ   SEU5         ; $
1496.0000 SEU4:       LHLD  TEMPX        ; TOP ENCOUNTERED
1497.0000             SHLD  LULB&        ; RESTORE LULB&
1498.0000             LDA   TEMPL        ; STATE RESULT
1499.0000             CPI   MAXL         ; SOME TRANSITION FND AT ALL ?
```

```
1500.0000           RZ               ; -NO
1501.0000           LHLD  TEMPY      ; -YES ... RETURN PAR AT HL
1502.0000           RET              ;
1503.0000  SEU5:    MOV   E,M        ; SUPPL. ENTRY FOUND
1504.0000           INX   H          ; GET LULB OF SUPPL.
1505.0000           MOV   D,M        ; TO DE
1506.0000           INX   H          ;
1507.0000           XCHG             ;
1508.0000           SHLD  LULB&      ; STORE TEMP. LULB TO RAM
1509.0000           XCHG             ;
1510.0000           MOV   E,M        ; GET ENTRY ADDR
1511.0000           INX   H          ;  OF JU OF SUPPLEMENT ENTRY
1512.0000           MOV   D,M        ;
1513.0000           INX   H          ;
1514.0000           SHLD  TEMPZ      ; SAVE POINTER TO NXT SUPPL.E
1515.0000           XCHG             ;
1516.0000           SHLD  TEMPW      ; SAVE JU ENTRY ADDR
1517.0000           RST   #5GTSTW    ; INVESTIGATE AVAILIBILITY
1518.0000           DCX   H          ;
1519.0000           MOV   A,M        ;
1520.0000           ANI   SPHSIGN    ; JUNCTION UNIT IS -
1521.0000           JZ    SEU6       ; - DETACHED...
1522.0000           MVI   B,0        ; - ATTACHED.. SET PAR LENGTH=0
1523.0000           CALL  SEREC      ; SEARCH EXT RECURSIVE
1524.0000           JZ    SEU6       ; -NEGATIVE
1525.0000           LXI   H,TEMPL    ; - POSITIVE , CHECK FOR
1526.0000           MOV   A,B        ; BEST TRANSITION, IF
1527.0000           CMP   M          ; EQUAL PREFER THE ONE
1528.0000           JNC   SEU6       ; FOUND FIRST
1529.0000           MOV   M,B        ; SET UP LENTGH OF BEST
1530.0000           LHLD  TEMPW      ; TRANSITION
1531.0000           SHLD  TEMPY      ; OVERWRITE RESULT
1532.0000  SEU6:    LHLD  TEMPZ      ; STEP TO NEXT
1533.0000           JMP   SEU3       ; SUPPL. ENTRY, ITERATE...
1534.0000 ;                          ;
1535.0000 ;                          ;
1536.0000 ; RECURSIVELY DEFINED SUBROUTINE
1537.0000 ; -- SEARCH EXTENDED UNIT RECURSIVE --
1538.0000 ; GLOBALS: POINTER TO SOME LULT AT LULB&
1539.0000 ;          UNIT WANTED AT TEMPU
1540.0000 ;          CONSTR. CORRESPONDING FLAGS AT TEMPV
1541.0000 ; PARAMETERS: CURRENT LENGTH OF TRANSITION AT B REG
1542.0000 ;             ZERO FLAG (OUT ONLY)
1543.0000 ; STACK USAGE: 3 LEVELS PER RECURSION
1544.0000 ;                          ;
1545.0000  SEREC:   INR   B          ; INCREMENT LENGTH OF
1546.0000           PUSH  B          ; TRANSITION, SAVE PAR
1547.0000           LHLD  LULB&      ; GET STATUS FLAG
1548.0000           DCX   H          ;
1549.0000           MOV   B,M        ; CHECK IF LULT HAS BEEN
1550.0000           LXI   H,TEMPV    ; INVESTIGATED YET
1551.0000           MOV   A,M        ; OR CORR. CONSTR.
1552.0000           ANA   B          ; NOT PROCESSING
1553.0000           CMP   B          ;
1554.0000           JNZ   SEREC1     ;
1555.0000           POP   B          ; SEARCHED ALREADY
1556.0000           RZ               ; RETURN ZERO
1557.0000  SEREC1:  MOV   A,M        ;
1558.0000           ORA   B          ; INDICATE LULT SEARCHED IN
1559.0000           MOV   M,A        ;
1560.0000           LHLD  LULB&      ;
```

```
1561.0000              LDA   TEMPU      ; GET UNIT IN QUESTION
1562.0000              MOV   E,A        ; TO E REGISTER
1563.0000              CALL  SLULT      ; SEARCH IN LOKAL U L
1564.0000              JZ    SEREC2     ; - NOT FOUND
1565.0000              POP   B          ; - FOUND
1566.0000              RNZ              ; RETURN NOT ZERO
1567.0000  SEREC2:     POP   H          ; PRESET LOKAL VARIABLE
1568.0000              MVI   C,MAXL     ; LENGTH - WORST
1569.0000              PUSH  B          ;
1570.0000  SEREC3:     INX   H          ; ($) STEP TO BASE
1571.0000              MOV   A,M        ; $    OF SUPPL.
1572.0000              INX   H          ; $ SKIP SPACES LEFT
1573.0000              ORA   M          ; $ 0000H
1574.0000              JZ    SEREC3     ; $
1575.0000              DCX   H          ;
1576.0000  SEREC4:     MOV   A,M        ; $ DETECT TOP
1577.0000              INX   H          ; $ OF SUPPLEMENT
1578.0000              CMP   M          ; $
1579.0000              DCX   H          ; $ FFFFH
1580.0000              JNZ   SEREC5     ; $
1581.0000              CPI   EOL        ; $
1582.0000              JNZ   SEREC5     ; $
1583.0000              POP   B          ; TOP ENCOUNTERED
1584.0000              MVI   A,MAXL     ; CHECK LOKAL VAR LENGTH
1585.0000              CMP   C          ; LOAD ZERO FLAG
1586.0000              RZ               ; RETURN ZERO
1587.0000              MOV   A,B        ; COMPUTE LENGTH
1588.0000              ADD   C          ;
1589.0000              MOV   B,A        ; RETURN LENGTH
1590.0000              RET              ; RETURN NOT ZERO
1591.0000  SEREC5:     MOV   E,M        ; GET LULB OF
1592.0000              INX   H          ; SUPPL. ENTRY
1593.0000              MOV   D,M        ;
1594.0000              INX   H          ;
1595.0000              XCHG             ;
1596.0000              SHLD  LULB&      ; STORE IT TO RAM
1597.0000              XCHG             ;
1598.0000              MOV   E,M        ; GET JU ENTRY ADDR
1599.0000              INX   H          ; OF JU OF SUPPL ENTRY
1600.0000              MOV   D,M        ;
1601.0000              INX   H          ;
1602.0000              PUSH  H          ; SAVE POINTER TO NXT ENTRY
1603.0000              XCHG             ;
1604.0000              RST   #5GTSTW    ; CHECK AVAILIBILITY OF
1605.0000              DCX   H          ; JU PRESENTLY BEEING CONSIDERED
1606.0000              MOV   A,M        ;
1607.0000              ANI   SPHSIGN    ; JU IS -
1608.0000              POP   H          ;
1609.0000              JZ    SEREC4     ; - DETACHED
1610.0000              PUSH  H          ; - ATTACHED
1611.0000              MVI   B,0        ; SET PAR LENGTH FOR
1612.0000              CALL  SEREC      ; RECURSIVE CALL
1613.0000              POP   H          ;
1614.0000              JZ    SEREC4     ; CHECK RESULT...
1615.0000              MOV   A,B        ; COMPARE LENGTH OF TRANSITION
1616.0000              POP   B          ; FOUND TO CURRENT FAVOURIT
1617.0000              CMP   C          ;
1618.0000              JNC   SEREC6     ; IF NEW LENGTH IS L.T. CURR. FAVORIT
1619.0000              MOV   C,A        ; THEN OVERWRITE LOKAL VAR LENGTH
1620.0000  SEREC6:     PUSH  B          ; SAVE PAR,VAR
1621.0000              JMP   SEREC4     ; NEXT ITERATION
1622.0000  ;                            ;
```

```
1623.0000  CJSPE:   LHLD  SRCP&    ; HL=SRCP
1624.0000           INX   H        ; HL=SRCP+1
1625.0000           XRA   A        ;
1626.0000           MOV   B,A      ; CLEAR FSV
1627.0000           MVI   A,DIMSK  ; 0000 0100
1628.0000           ANA   M        ;
1629.0000           JZ    $+7      ;
1630.0000           MVI   A,FSV2   ; 0000 0100
1631.0000           ORA   B        ;
1632.0000           MOV   B,A      ;
1633.0000           MVI   A,JUMSK  ; 0000 0010
1634.0000           ANA   M        ;
1635.0000           JZ    $+7      ;
1636.0000           MVI   A,FSV6   ;0100 0000
1637.0000           ORA   B        ;
1638.0000           MOV   B,A      ;
1639.0000           MVI   A,MLMSK  ; 0000 0001
1640.0000           ANA   M        ;
1641.0000           JZ    $+7      ;
1642.0000           MVI   A,FSV4   ; 0001 0000
1643.0000           ORA   B        ;
1644.0000           MOV   B,A      ;
1645.0000           XCHG           ; DE=SRCP+1
1646.0000           LHLD  DSTP&    ; HL=DSTP
1647.0000           INX   H        ; HL=DSTP+1
1648.0000           MVI   A,DIMSK  ; 0000 0100
1649.0000           ANA   M        ;
1650.0000           JZ    $+7      ;
1651.0000           MVI   A,FSV1   ; 0000 0010
1652.0000           ORA   B        ;
1653.0000           MOV   B,A      ;
1654.0000           MVI   A,JUMSK  ; 0000 0010
1655.0000           ANA   M        ;
1656.0000           JZ    $+7      ;
1657.0000           MVI   A,FSV5   ; 0010 0000
1658.0000           ORA   B        ;
1659.0000           MOV   B,A      ;
1660.0000           MVI   A,MLMSK  ; 0000 0001
1661.0000           ANA   M        ;
1662.0000           JZ    $+7      ;
1663.0000           MVI   A,FSV3   ; 0000 1000
1664.0000           ORA   B        ;
1665.0000           MOV   B,A      ;
1666.0000           JMP   NEWVERS  ;
1667.0000           MVI   C,FSV43  ; 0001 1000
1668.0000           MOV   A,C      ;
1669.0000           ANA   B        ;
1670.0000           CMP   C        ;
1671.0000           JNZ   UPDTP    ; DE=SRCP+1 HL=DSTP+1
1672.0000           INX   D        ;DE=SRCP+2 :BRANCH ADDR
1673.0000           INX   H        ; HL=DSTP+2 /BRANCH ADD
1674.0000           MOV   A,M      ; A=DEST BRANCH ADDR
1675.0000           XCHG           ; HL=SRCP+2 /BRANCH ADDR
1676.0000           CMP   M        ; SET ZERO IF SAME BR
1677.0000           JNZ   ADREL    ; DE=DSTP+2 HL=SRCP+2
1678.0000           MVI   A,FSV7   ; 1000 0000
1679.0000           ORA   B        ;
1680.0000           MOV   B,A      ;
1681.0000           DCX   H        ;
1682.0000           DCX   H        ; HL=SRCP
1683.0000           DCX   D        ;
1684.0000           DCX   D        ; DE=DSTP
1685.0000           JMP   ADREL    ; DE=DSTP HL=SRCP
```

```
1686.0000 UPDTP:   MVI    A,FSV4    ; DE=SRCP+1 HL=DSTP+1
1687.0000          ANA    B         ;
1688.0000          JZ     $+5       ;
1689.0000          INX    D         ; DE=SRCP+2 /BRANCH ADDR
1690.0000          INX    D         ; COMPENS. DCX
1691.0000          DCX    D         ; DE=SRCP
1692.0000          MVI    A,FSV3    ; HL=DSTP+1
1693.0000          ANA    B         ;
1694.0000          JZ     $+5       ;
1695.0000          INX    H         ; HL=DSTP+2 /BRANCH ADDR
1696.0000          INX    H         ; COMPENS. DCX
1697.0000          DCX    H         ; HL=DSTP
1698.0000          XCHG             ;
1699.0000 ADREL:   MOV    A,M       ; DE=DESTIN HL=SOURC M L ADDR
1700.0000          XCHG             ; HL=DESTIN MAIN LINE A.
1701.0000          SUB    M         ; SRC M L A. - DST M L A.
1702.0000          JM     $+7       ; LEAVE #S.LT.D#
1703.0000          MVI    A,FSV0    ; 0000 0001
1704.0000          ORA    B         ;
1705.0000          MOV    B,A       ;
1706.0000 NEWVERS: NOP              ;
1707.0000 ADREL0:  MVI    A,FSV43   ; DETERMINE
1708.0000          ANA    B         ; ADDRESS RELATION
1709.0000          CPI    FSV43     ;
1710.0000          JNZ    ADREL1    ;
1711.0000          INX    H         ; BOTH AT MINOR LINE
1712.0000          INX    D         ;
1713.0000          LDAX   D         ;
1714.0000          CMP    M         ;
1715.0000          DCX    H         ;
1716.0000          DCX    D         ;
1717.0000          JNZ    ADREL1    ;
1718.0000          MVI    A,FSV7    ; SAME MINOR LINE
1719.0000          ORA    B         ;
1720.0000          MOV    B,A       ;
1721.0000 ADREL1:  MOV    A,D       ; COMPARE POINTERS
1722.0000          CMP    H         ;
1723.0000          JNZ    ADREL2    ;
1724.0000          MOV    A,E       ;
1725.0000          CMP    L         ;
1726.0000          CZ     DUMP      ;
1727.0000 ADREL2:  JC     ADREL3    ;
1728.0000          MVI    A,FSV0    ; INDICATE 'SRC GT DST'.
1729.0000          ORA    B         ;
1730.0000          MOV    B,A       ;
1731.0000 ADREL3:  NOP              ;
1732.0000 QFDET:   MVI    A,F7210   ; 1000 0111 = 135
1733.0000          ANA    B         ;
1734.0000          SUI    QFA1      ; 0XXX X100 = 4
1735.0000          JZ     INDQF     ;
1736.0000          MVI    A,F7210   ; 0XXX X011 = 3
1737.0000          ANA    B         ;
1738.0000          SUI    QFA2      ;
1739.0000          JZ     INDQF     ;
1740.0000          XRA    A         ;
1741.0000          MOV    C,A       ;
1742.0000 TFDET:   MVI    A,FSV21   ; IF
1743.0000          ANA    B         ; DIRECTIONS
1744.0000          CPI    FSV1      ; DIFFER
1745.0000          JZ     INDTF     ; WHILE
1746.0000          CPI    FSV2      ; NO QUICK FLOW
1747.0000          JZ     INDTF     ;
1748.0000          JMP    STJSP     ;
```

```
1749.0000 INDTF:    MVI   C,FCI1      ; TROUBLE FLOW
1750.0000          JMP   STJSP       ;
1751.0000 INDQF:   MVI   C,FCI0      ; 0000 0001
1752.0000 STJSP:   LXI   H,FSPV&     ;
1753.0000          MOV   M,B         ; STORE FSV
1754.0000          INX   H           ;
1755.0000          MOV   M,C         ; STORE FCI
1756.0000          RET               ;
1757.0000 ;                          ;
1758.0000 ;   CHECK IF SOME TRANSITION IS INTENDED
1759.0000 ;   TOWARDS A POTENTIAL SENDING UNIT GIVEN
1760.0000 ;   - RESULTS IN "ZERO=1" IF UNIT EITHER
1761.0000 ;       * DOESN'T INCLUDE AN ARRIVAL CONTR.
1762.0000 ;   OR * THERE IS NO TRANSITION BEEING INDICATED
1763.0000 ;          NEITHER ** LOKALY (REF TO DEMTBLE)
1764.0000 ;             NOR ** EXTERNALY (REF TO JU MAIL)
1765.0000 ;   - EXCEPT RECEIVER IS LOCKED WHILE
1766.0000 ;          SYSTEM RUNMODE = LOCK ENABLE
1767.0000 ;     AND/OR RECEIVER INCLUDES ARRIVAL CONTR.
1768.0000 ;            AND SOME SRQ IS BEING PROCESSED -
1769.0000 ;    UNLESS THE ACCORDING TRANS.'S STARTED YET
1770.0000 ;                          ;
1771.0000 CHONCOT:  PUSH  H           ;
1772.0000          CALL  CHRECVC     ; REC VACANCY
1773.0000          POP   H           ;
1774.0000          RNZ               ;
1775.0000 CHONCOT1: PUSH  H           ;
1776.0000          LHLD  RECUNIT     ;
1777.0000          CALL  CHRECLK     ; REC LOCK MODE
1778.0000          POP   H           ;
1779.0000          RNZ               ;
1780.0000 CHONCOT2: MOV   E,M         ; CHECK ON SENDER
1781.0000          INX   H           ;
1782.0000          MOV   A,M         ;
1783.0000          ANI   ECMSK       ;
1784.0000          RZ                ;
1785.0000          LHLD  LULB&       ;
1786.0000 LOKNEXT:  CALL  GTPST       ;
1787.0000          ANI   IDLESTAT OR ERROR ;
1788.0000          JZ    LOKINCR     ;
1789.0000          PUSH  H           ;
1790.0000          CALL  DISPLDEM    ;
1791.0000          MOV   A,M         ;
1792.0000          POP   H           ;
1793.0000          CMP   E           ;
1794.0000          JZ    CMFLAGS     ;
1795.0000 LOKINCR:  CALL  HLUPDATE    ;
1796.0000          JNZ   LOKNEXT     ;
1797.0000 EXTCHECK: LXI   H,JU001     ;
1798.0000          MVI   D,NRJU+1    ;
1799.0000 EXTNEXT:  DCR   D           ;
1800.0000          RZ                ;
1801.0000          MOV   A,M         ;
1802.0000          ANI   JUSRQFL     ;
1803.0000          INX   H           ;
1804.0000          JZ    EXTNSRQ     ;
1805.0000          MOV   A,M         ;
1806.0000          CMP   E           ;
1807.0000          JZ    CMFLAGS     ;
1808.0000 EXTNSRQ:  INX   H           ;
1809.0000          INX   H           ;
```

```
1810.0000              INX   H              ;
1811.0000              JMP   EXTNEXT        ;
1812.0000 ;                                 ;
1813.0000 ; CHECK RECEIVER VACANCY
1814.0000 ; RETURN ZERO=1 (REC VACANT) IF
1815.0000 ;  - NO ARRIVAL CONTROLER EXISTING
1816.0000 ; OR NO SRQ BEING PROCESSED MOMENTARILY
1817.0000 CHRECVC:    LHLD  RECUNIT        ;
1818.0000              INX   H              ;
1819.0000              MOV   A,M            ;
1820.0000              DCX   H              ;
1821.0000              ANI   ECMSK          ;
1822.0000              RZ                   ;
1823.0000              CALL  QSRQ           ;
1824.0000              PUSH  PSW            ;
1825.0000              CALL  READR          ;
1826.0000              POP   PSW            ;
1827.0000              RZ                   ;
1828.0000              MOV   A,E            ;
1829.0000              PUSH  H              ;
1830.0000              CALL  DISPLDEM       ;
1831.0000              CMP   M              ;
1832.0000              POP   H              ;
1833.0000              CALL  CMFLAGS        ;
1834.0000              RZ                   ;
1835.0000              CALL  GTPST          ;
1836.0000              JMP   CMFLAGS        ;
1837.0000 ;                                 ;
1838.0000 ; CHECK REC LOCKED ( ZERO := NOT CARRY )
1839.0000 CHRECLK:    CALL  QSRQ           ;
1840.0000              CALL  READR          ;
1841.0000              JC    CHRECLK1       ;
1842.0000              XRA   A              ;
1843.0000              RET                  ; REC UNLOCKED - ZERO=1
1844.0000 CHRECLK1:   ORA   B              ;
1845.0000              RET                  ; REC LOCKED - ZERO=0
1846.0000 ;                                 ;
1847.0000 ;                                 ; RESET ALL
1848.0000 ;                                 ; TUBE CONTROLERS
1849.0000 CLTCS:      CALL  FCNTR          ; HL=ENTRY INLUL
1850.0000 ;                ;                ; DST OR JUDST
1851.0000              INX   H              ;
1852.0000              MVI   A,OLMSK        ;
1853.0000              ORI   JUMSK          ;
1854.0000              ANA   M              ;
1855.0000              DCX   H              ;
1856.0000              CNZ   FVCNTR         ;
1857.0000 ;                ;                ; OUTLET SOMEWHER
1858.0000              INX   H              ;
1859.0000              MVI   A,MLMSK        ;
1860.0000              ANA   M              ;
1861.0000              DCX   H              ;
1862.0000              RZ                   ;
1863.0000              INX   H              ;
1864.0000              INX   H              ;
1865.0000              CALL  FMCNTR         ;
1866.0000 ;                ;                ; MINOR LINE
1867.0000              DCX   H              ;
1868.0000              DCX   H              ;
1869.0000              RET                  ;
1870.0000 ALTAI:      CALL  FRESET         ; ALTER
```

```
1871.0000 ;            ;              ; AIR INLET
1872.0000              CALL FSWITCH   ; FROM
1873.0000 ;            ;              ; SLIDE
1874.0000              CALL FOUTLET   ; TO
1875.0000 ;            ;              ; VALVE
1876.0000              RET            ;
1877.0000 ;                           ;
1878.0000 SLCEREPO:    LDA  REPORT    ; TYPES :
1879.0000              ANI  1+2       ;
1880.0000              RZ             ;
1881.0000              CALL CRLF      ;
1882.0000              LDA  PROC&     ;
1883.0000              INR  A         ;
1884.0000              CALL OUTDIGIT  ;
1885.0000              CALL PERIOD    ;
1886.0000              CALL PERIOD    ;
1887.0000              JMP  BLANK     ;
1888.0000 ;                           ;
1889.0000 FPLOCK:      CALL STATEERR  ;
1890.0000              PUSH H         ;
1891.0000              RST  #5GTSTW   ;
1892.0000              JZ   FBLOCK1   ;
1893.0000              MVI  A,JUERFL  ;
1894.0000              ORA  B         ;
1895.0000              MOV  M,A       ;
1896.0000              POP  H         ;
1897.0000              RET            ;
1898.0000 FBLOCK1:     MVI  A,BLOCK   ;
1899.0000              POP  H         ;
1900.0000              JMP  FUNCT     ;
1901.0000 FCNTR:       MVI  A,CNTR    ;
1902.0000              JMP  FUNCT     ;
1903.0000 FOUTLET:     MVI  A,OUTLET  ;
1904.0000              JMP  FUNCT     ;
1905.0000 FRESET:      MVI  A,RESET   ;
1906.0000              JMP  FUNCT     ;
1907.0000 FSWITCH:     MVI  A,SWITCH  ;
1908.0000              JMP  FUNCT     ;
1909.0000 FOPEN:       MVI  A,OPEN    ;
1910.0000              JMP  FUNCT     ;
1911.0000 FSHIFT:      MVI  A,SHIFT   ;
1912.0000              JMP  FUNCT     ;
1913.0000 FOCP:        MVI  A,OCP     ;
1914.0000              JMP  FUNCT     ;
1915.0000 FFREE:       MVI  A,FREE    ;
1916.0000              JMP  FUNCT     ;
1917.0000 FRJT:        RET            ;&#$MVI   A,RJT
1918.0000              JMP  FUNCT     ;
1919.0000 FVCNTR:      MVI  A,VCNTR   ;
1920.0000              JMP  FUNCT     ;
1921.0000 QAVL:        MVI  A,AVL     ;
1922.0000              JMP  QUERY     ;
1923.0000 QCNTR:       MVI  A,CNTR    ;
1924.0000              JMP  QUERY     ;
1925.0000 QQSWITCH:    MVI  A,QSWITCH ;
1926.0000              JMP  QUERY     ;
1927.0000 QQSLIDE:     MVI  A,QSLIDE  ;
1928.0000              JMP  QUERY     ;
1929.0000 QQSTORE:     MVI  A,QSTORE  ;
1930.0000              JMP  QUERY     ;
1931.0000 QSRQ:        MVI  A,SRQ     ;
1932.0000              JMP  QUERY     ;
```

```
1933.0000 QVCNTR:    MVI   A,VCNTR   ;
1934.0000            JMP   QUERY     ;
1935.0000 FRECVL:    MVI   A,RECVL   ;
1936.0000            JMP   FUNCT     ;
1937.0000 FSNDVL:    MVI   A,SNDVL   ;
1938.0000            JMP   FUNCT     ;
1939.0000 FMCNTR:    MVI   A,MCNTR   ;
1940.0000            JMP   FUNCT     ;
1941.0000 QMCNTR:    MVI   A,MCNTR   ;
1942.0000            JMP   QUERY     ;
1943.0000 ;                          ;
1944.0000 FMLSWI:    CALL  GTPST     ;
1945.0000            ORI   MLSSTAT   ;
1946.0000            STAX  D         ;
1947.0000            JMP   FSWITCH   ;
1948.0000 FMLVLV:    CALL  GTPST     ;
1949.0000            ORI   MLVSTAT   ;
1950.0000            STAX  D         ;
1951.0000            JMP   FOUTLET   ;
1952.0000 FMLRESET:  CALL  FRESET    ;
1953.0000            CALL  GTPST     ;
1954.0000            ANI   NOT MLSSTAT ;
1955.0000            STAX  D         ;
1956.0000            ANI   MLVSTAT   ;
1957.0000            JNZ   FOUTLET   ;
1958.0000            RET             ;
1959.0000 FMLCLOSE:  CALL  FOPEN     ;&#$CALL FRESET
1960.0000            CALL  GTPST     ;
1961.0000            ANI   NOT MLVSTAT ;
1962.0000            STAX  D         ;
1963.0000            ANI   MLSSTAT   ;
1964.0000            JNZ   FSWITCH   ;
1965.0000            RET             ;
1966.0000 ;                          ;
1967.0000 ;                          ;
1968.0000 FAIR:      PUSH  H         ;
1969.0000            CALL  PREAIR    ;
1970.0000            CALL  FUNCT     ;
1971.0000            POP   H         ;
1972.0000            RET             ;
1973.0000 ;                          ;
1974.0000 QAIR:      PUSH  H         ;
1975.0000            CALL  PREAIR    ;
1976.0000            CALL  QUERY     ;
1977.0000            POP   H         ;
1978.0000            RET             ;
1979.0000 ;                          ;
1980.0000 PREAIR:    MOV   C,A       ;
1981.0000            LXI   H,PROC&   ;
1982.0000            MVI   A,0E0H    ;
1983.0000            ORA   M         ;
1984.0000            DCX   H         ;
1985.0000            MOV   M,A       ;
1986.0000            MOV   A,C       ;
1987.0000            RET             ;
1988.0000 ;                          ;
1989.0000 FCLEAR:    MVI   A,CLEAR   ;
1990.0000            JMP   FAIR      ;
1991.0000 FRELEASE:  MVI   A,RELEASE ;
1992.0000            JMP   FAIR      ;
1993.0000 ;          ;NEUTRALIZE   MOD ALL
1994.0000 ;          ; AIR CONTROL
1995.0000 ;          ; FACILITY REFERENCE AT HL
```

```
1996.0000 NTRAC:    CALL FRELEASE ;
1997.0000           JMP  FCLEAR   ;
1998.0000 ;                       ;
1999.0000 ;        ; NEUTRALIZE  MOD ALL
2000.0000 ;        ; UNIT WITH SUPPLEMENT
2001.0000 ;        ; DEVICE REFERENCE AT HL
2002.0000 NTRUNIT: CALL FRESET   ; RESET
2003.0000 ;                      ; UNIT
2004.0000          CALL GTML     ;
2005.0000          RZ            ;
2006.0000          CALL FMLRESET ;
2007.0000          CALL FMLCLOSE ;
2008.0000          DCX  H        ;
2009.0000          DCX  H        ;
2010.0000          RET           ;
2011.0000 ;                      ;
2012.0000 ACAVL:   MVI  A,AC1AVL ;
2013.0000          CALL QAIR     ;
2014.0000          RZ            ;
2015.0000          MVI  A,AC2AVL ;
2016.0000          JMP  QAIR     ;
2017.0000 ;                      ;
2018.0000 GTML:    INX  H        ;
2019.0000          MVI  A,MLMSK  ;
2020.0000          ANA  M        ;
2021.0000          INX  H        ;
2022.0000          RNZ           ;
2023.0000          DCX  H        ;
2024.0000          DCX  H        ;
2025.0000          RET           ;
2026.0000 ;                      ;
2027.0000 STATEERR: PUSH B       ;
2028.0000          CALL GTPST    ;
2029.0000          ORI  ERROR    ;
2030.0000          STAX D        ;
2031.0000          POP  B        ;
2032.0000          RET           ;
2033.0000 ;                      ;
2034.0000 RSTBLINK: PUSH PSW     ;
2035.0000          PUSH H        ;
2036.0000          LXI  H,BLINKV ;
2037.0000          JMP  RESTRST  ;
2038.0000 ;                      ;
2039.0000 RSTERROR: PUSH PSW     ;
2040.0000          PUSH H        ;
2041.0000          LXI  H,ERRORV ;
2042.0000          JMP  RESTRST  ;
2043.0000 ;                      ;
2044.0000 RSTDEBUG: PUSH PSW     ;
2045.0000          PUSH H        ;
2046.0000          LXI  H,DEBUGV ;
2047.0000          JMP  RESTRST  ;
2048.0000 ;                      ;
2049.0000 RSTBUSY: PUSH PSW      ;
2050.0000          PUSH H        ;
2051.0000          LXI  H,BUSYV  ;
2052.0000          JMP  RESTRST  ;
2053.0000 ;                      ;
2054.0000 RSTACTIVE: PUSH PSW    ;
2055.0000          PUSH H        ;
2056.0000          LXI  H,ACTIVV ;
```

```
2057.0000 RESTRST:  LDA   STFL&    ;
2058.0000           CMA            ;
2059.0000           ANA   M        ;
2060.0000           MOV   M,A      ;
2061.0000           POP   H        ;
2062.0000           POP   PSW      ;
2063.0000           RET            ;
2064.0000 ;                        ;
2065.0000 SETBLINK: PUSH  PSW      ;
2066.0000           PUSH  H        ;
2067.0000           LXI   H,BLINKV ;
2068.0000           JMP   RESTSET  ;
2069.0000 ;                        ;
2070.0000 SETVR:    PUSH  PSW      ;
2071.0000           PUSH  H        ;
2072.0000           LXI   H,EVACRV ;
2073.0000           JMP   RESTSET  ;
2074.0000 ;                        ;
2075.0000 SETERROR: PUSH  PSW      ;
2076.0000           PUSH  H        ;
2077.0000           LXI   H,ERRORV ;
2078.0000           JMP   RESTSET  ;
2079.0000 ;                        ;
2080.0000 SETBUSY:  PUSH  PSW      ;
2081.0000           PUSH  H        ;
2082.0000           LXI   H,BUSYV  ;
2083.0000           JMP   RESTSET  ;
2084.0000 ;                        ;
2085.0000 SETACTIVE: PUSH PSW      ;
2086.0000           PUSH  H        ;
2087.0000           LXI   H,ACTIVV ;
2088.0000 RESTSET:  LDA   STFL&    ;
2089.0000           ORA   M        ;
2090.0000           MOV   M,A      ;
2091.0000           POP   H        ;
2092.0000           POP   PSW      ;
2093.0000           RET            ;
2094.0000 VECTDZB:  CALL  VARBLK   ;
2095.0000 TDZB:     MOV   A,M      ;
2096.0000           ANI   DIMSK    ;
2097.0000 TZB:      JZ    TUBE     ;
2098.0000           JMP   BLANK    ;
2099.0000 ;                        ;
2100.0000 ;                        ;
2101.0000 VECBDZT:  CALL  VARBLK   ;
2102.0000 BDZT:     MOV   A,M      ;
2103.0000           ANI   DIMSK    ;
2104.0000 BZT:      JZ    BLANK    ;
2105.0000           JMP   TUBE     ;
2106.0000 ;                        ;
2107.0000 STPOS:    MVI   A,CR     ;
2108.0000           CALL  OUTCHAR  ;
2109.0000           MOV   A,M      ;
2110.0000           ANI   MLMSK    ;
2111.0000           MVI   C,31+15  ;
2112.0000           JNZ   VARBLK   ;
2113.0000           MVI   C,15     ;
2114.0000           JMP   VARBLK   ;
2115.0000 ;                        ;
2116.0000 SPSLPOS:  CALL  TUBES    ;
2117.0000 SLIDEPOS: CALL  STPOS    ;
2118.0000           CALL  BLANK    ;
2119.0000           MVI   C,11     ;
```

```
2120.0000              MVI   A,ICHAR     ;
2121.0000              JMP   OUTCHAR     ;
2122.0000  ;                             ;
2123.0000  COMMA:      MVI   A,','       ;
2124.0000              CALL  OUTCHAR     ;
2125.0000              JMP   BLANK       ;
2126.0000  ;                             ;
2127.0000  VBCR30T:    CALL  CRLF        ;
2128.0000  VB30T:      MVI   C,30        ;
2129.0000  VBCT:       CALL  VARBLK      ;
2130.0000  TUBE:       MVI   A,TUBECHAR  ;
2131.0000              JMP   OUTCHAR     ;
2132.0000  ;                             ;
2133.0000  TUBES2:     CALL  TUBES       ;
2134.0000  TUBES:      CALL  CRLF        ;
2135.0000              CALL  VB30T       ;
2136.0000              MOV   A,M         ;
2137.0000              ANI   MLMSK       ;
2138.0000              JZ    CARRIT      ;
2139.0000              CALL  VB30T       ;
2140.0000  CARRIT:     MVI   A,CR        ;
2141.0000              JMP   OUTCHAR     ;
2142.0000  ;                             ;
2143.0000  IMAGEML:    CALL  VBCR30T     ;
2144.0000              CALL  TDZB        ;
2145.0000              MVI   C,28        ;
2146.0000              CALL  VBCT        ;
2147.0000              CALL  VBCR30T     ;
2148.0000              MVI   C,1         ;
2149.0000              CALL  VBCTDZB     ;
2150.0000              MVI   C,26        ;
2151.0000              CALL  VBCT        ;
2152.0000              CALL  VBCR30T     ;
2153.0000              MVI   C,2         ;
2154.0000              CALL  VARBLK      ;
2155.0000              MVI   C,26        ;
2156.0000  IMAGEML1:   CALL  TUBE        ;
2157.0000              DCR   C           ;
2158.0000              JNZ   IMAGEML1    ;
2159.0000              CALL  VBCR30T     ;
2160.0000              MVI   C,1         ;
2161.0000              CALL  VBCBDZT     ;
2162.0000              CALL  VBCR30T     ;
2163.0000              CALL  BDZT        ;
2164.0000              CALL  BLANK       ;
2165.0000              PUSH  H           ;
2166.0000              LXI   H,MSGML     ;
2167.0000              CALL  OUTSTRING   ;
2168.0000              POP   H           ;
2169.0000              INX   H           ;
2170.0000              MOV   A,M         ;
2171.0000              DCX   H           ;
2172.0000              JMP   OUTINT      ;
2173.0000  ;                             ;
2174.0000  IMAGEU:     CALL  STPOS       ;
2175.0000              DCX   H           ;
2176.0000              MOV   A,M         ;
2177.0000              INX   H           ;
2178.0000              CALL  OUTINT      ;
2179.0000              MVI   C,7         ;
2180.0000              CALL  VARBLK      ;
2181.0000              MOV   A,M         ;
2182.0000              ANI   OLMSK       ;
```

```
2183.0000              CALL BZT         ;
2184.0000              CALL STPOS       ;
2185.0000              JNZ  IMAGEU11    ;
2186.0000              MVI  C,15        ;
2187.0000              CALL VBCTDZB     ;
2188.0000  IMAGEU11:   CALL SPSLPOS     ;
2189.0000              MVI  C,7         ;
2190.0000              CALL VARBLK      ;
2191.0000              MOV  A,M         ;
2192.0000              ANI  OLMSK       ;
2193.0000              CALL BZT         ;
2194.0000              CALL STPOS       ;
2195.0000              JNZ  IMAGEU12    ;
2196.0000              MVI  C,14        ;
2197.0000              CALL VBCTDZB     ;
2198.0000  IMAGEU12:   CALL TUBES       ;
2199.0000              MOV  A,M         ;
2200.0000              ANI  MLMSK       ;
2201.0000              CNZ  BLANK       ;++
2202.0000              CNZ  VB3DT       ;
2203.0000  IMAGEU2:    MVI  C,4         ;
2204.0000              CALL VARBLK      ;
2205.0000              MOV  A,M         ;
2206.0000              ANI  JUMSK       ;
2207.0000              JZ   IMAGEU4     ;
2208.0000              MVI  C,6         ;
2209.0000  IMAGEU3:    CALL BZT         ;
2210.0000              CALL TZB         ;
2211.0000              DCR  C           ;
2212.0000              JNZ  IMAGEU3     ;
2213.0000  IMAGEU4:    CALL STPOS       ;
2214.0000              CNZ  BLANK       ;++
2215.0000              MVI  C,13        ;
2216.0000  IMAGEU5:    CALL TUBE        ;
2217.0000              DCR  C           ;
2218.0000              JNZ  IMAGEU5     ;
2219.0000              CALL SPSLPOS     ;
2220.0000              JNZ  IMAGEU6     ;
2221.0000              CALL VBCBDZT     ;
2222.0000              CALL SPSLPOS     ;
2223.0000              INR  C           ;
2224.0000              CALL VBCBDZT     ;
2225.0000              JMP  TUBES       ;
2226.0000  IMAGEU6:    CALL VBCT        ;
2227.0000              CALL SPSLPOS     ;
2228.0000              INR  C           ;
2229.0000              CALL VBCT        ;
2230.0000              JMP  TUBES       ;
2231.0000  ;                            ;
2232.0000  PLOTTING:   MVI  A,01H       ;
2233.0000              STA  ECHOST      ;
2234.0000              MVI  C,5         ;
2235.0000  PLOT1:      CALL CRLF        ;
2236.0000              DCR  C           ;
2237.0000              JNZ  PLOT1       ;
2238.0000              LXI  H,MSGCN     ;
2239.0000              CALL OUTSTRING   ;
2240.0000              LDA  PROC&       ;
2241.0000              INR  A           ;
2242.0000              CALL OUTINT      ;
2243.0000              CALL CRLF2       ;
2244.0000              LHLD LULB&       ;
```

```
2245.0000              INX   H         ;
2246.0000              MOV   D,H       ;
2247.0000              MOV   E,L       ;
2248.0000              CALL  TUBES2    ;
2249.0000              CALL  TUBES2    ;
2250.0000   PLOT2:     MOV   A,M       ;
2251.0000              ANI   MLMSK     ;
2252.0000              JZ    PLOT3     ;
2253.0000              LDAX  D         ;
2254.0000              ANI   MLMSK     ;
2255.0000              JZ    PLOT21    ;
2256.0000              INX   D         ;
2257.0000              LDAX  D         ;
2258.0000              DCX   D         ;
2259.0000              INX   H         ;
2260.0000              CMP   M         ;
2261.0000              DCX   H         ;
2262.0000              JZ    PLOT3     ;
2263.0000   PLOT21:    CALL  TUBES     ;
2264.0000              CALL  IMAGEML   ;
2265.0000   PLOT3:     XCHG            ;
2266.0000              CALL  TUBES2    ;
2267.0000              CALL  IMAGEU    ;
2268.0000              CALL  TUBES     ;
2269.0000              PUSH  H         ;
2270.0000              POP   D         ;
2271.0000              DCX   H         ;
2272.0000              CALL  HLUPDATE  ;
2273.0000              INX   H         ;
2274.0000              XCHG            ;
2275.0000              JNZ   PLOT2     ;
2276.0000              MOV   A,M       ;
2277.0000              ANI   MLMSK     ;
2278.0000              JZ    PLOT31    ;
2279.0000              CALL  TUBES2    ;
2280.0000              CALL  IMAGEML   ;
2281.0000   PLOT31:    XCHG            ;
2282.0000              CALL  VBCR3OT   ;
2283.0000              CALL  VBCR3OT   ;
2284.0000              CALL  CRLF2     ;
2285.0000   PLOT5:     CALL  SKIPSP    ;
2286.0000   PLOT6:     CALL  GETWORD   ;
2287.0000              JZ    PLOT9     ;
2288.0000   PLOT7:     PUSH  H         ;
2289.0000              LXI   H,MSGJU   ;
2290.0000              CALL  OUTSTRING ;
2291.0000              POP   H         ;
2292.0000              PUSH  D         ;
2293.0000              CALL  LDMH      ;
2294.0000              LDAX  D         ;
2295.0000              CALL  OUTINT    ;
2296.0000              POP   D         ;
2297.0000              PUSH  H         ;
2298.0000              LXI   H,MSGTO   ;
2299.0000              CALL  OUTSTRING ;
2300.0000              LXI   H,MSGCN   ;
2301.0000              CALL  OUTSTRING ;
2302.0000              PUSH  D         ;
2303.0000              DCX   D         ;
2304.0000              DCX   D         ;
2305.0000              DCX   D         ;
```

```
2306.0000              LDAX  D             ;
2307.0000              ANI   0FH           ;
2308.0000              CALL  OUTINT        ;
2309.0000              LXI   H,MSGTA       ;
2310.0000              CALL  OUTSTRING     ;
2311.0000              POP   H             ;
2312.0000  PLOT8:      INX   H             ;
2313.0000              MOV   A,M           ;
2314.0000              ANI   JUMSK         ;
2315.0000              DCX   H             ;
2316.0000              JNZ   PLOT81        ;
2317.0000              MOV   A,M           ;
2318.0000              CALL  OUTINT        ;
2319.0000              CALL  COMMA         ;
2320.0000  PLOT81:     CALL  HLUPDATE      ;
2321.0000              JNZ   PLOT8         ;
2322.0000              POP   H             ;
2323.0000              JMP   PLOT6         ;
2324.0000  PLOT9:      CALL  CRLF2         ;
2325.0000              CALL  CRLF2         ;
2326.0000              MVI   A,81H         ;
2327.0000              STA   ECHOST        ;
2328.0000              RET                 ;
2329.0000  ;                               ;
2330.0000  ;                               ;
2331.0000  YDATA       EQU   0             ; TTY DATA I/O
2332.0000  YSTATUS     EQU   1             ; TTY STATUS I/O
2333.0000  YINPR       EQU   00000001B     ; TTY INPUT READY
2334.0000  YOUTR       EQU   00000100B     ; TTY OUTPUT READY
2335.0000  YONOFF      EQU   00000001B     ; TTY PULS ON OFF
2336.0000  STOP        EQU   10000000B     ; END OF STRING
2337.0000  ;                               ;
2338.0000  ACHAR       EQU   041H          ;
2339.0000  BCHAR       EQU   042H          ;
2340.0000  CCHAR       EQU   043H          ;
2341.0000  DCHAR       EQU   044H          ;
2342.0000  ECHAR       EQU   045H          ;
2343.0000  FCHAR       EQU   046H          ;
2344.0000  GCHAR       EQU   047H          ;
2345.0000  HCHAR       EQU   048H          ;
2346.0000  ICHAR       EQU   049H          ;
2347.0000  JCHAR       EQU   04AH          ;
2348.0000  KCHAR       EQU   04BH          ;
2349.0000  LCHAR       EQU   04CH          ;
2350.0000  MCHAR       EQU   04DH          ;
2351.0000  NCHAR       EQU   04EH          ;
2352.0000  OCHAR       EQU   04FH          ;
2353.0000  PCHAR       EQU   050H          ;
2354.0000  QCHAR       EQU   051H          ;
2355.0000  RCHAR       EQU   052H          ;
2356.0000  SCHAR       EQU   053H          ;
2357.0000  TCHAR       EQU   054H          ;
2358.0000  UCHAR       EQU   055H          ;
2359.0000  VCHAR       EQU   056H          ;
2360.0000  WCHAR       EQU   057H          ;
2361.0000  XCHAR       EQU   058H          ;
2362.0000  YCHAR       EQU   059H          ;
2363.0000  ZCHAR       EQU   05AH          ;
2364.0000  CR          EQU   00DH          ;
2365.0000  LF          EQU   00AH          ;
```

```
2366.0000 ESC       EQU   01BH     ;
2367.0000 GOCHAR    EQU   03EH     ;
2368.0000 BLKCHAR   EQU   020H     ;
2369.0000 QMCHAR    EQU   03FH     ;
2370.0000 ARCHAR    EQU   05FH     ;
2371.0000 PLUSCHAR  EQU   02BH     ;
2372.0000 PERCHAR   EQU   '.'      ;
2373.0000 MAKECHAR  EQU   05FH     ;
2374.0000 TUBECHAR  EQU   OCHAR    ;
2375.0000 DIVIDE    EQU   02FH     ;
2376.0000 ;                        ;
2377.0000 LNELNGTH  EQU   67       ; LINE LENGTH
2378.0000 PGELNGTH  EQU   65       ; PAGE LENGTH
2379.0000 PGEPHYS   EQU   72       ; FORMAT DIN A4
2380.0000 ;                        ;
2381.0000 WASYATT   EQU   1        ;
2382.0000 BREAK     EQU   0FFH     ;
2383.0000 ;                        ;
2384.0000 TTYATT:   CALL  TTYDC    ;
2385.0000           IN    YSTATUS  ;
2386.0000           ANI   YINPR    ;
2387.0000           JNZ   CMFLAGS  ;
2388.0000           IN    YDATA    ;
2389.0000           CMA            ;
2390.0000           ANI   07FH     ;
2391.0000           CPI   CR       ;
2392.0000           JMP   CMFLAGS  ;
2393.0000 ;                        ;
2394.0000 TTYIR:    LDA   TTYRES   ;
2395.0000           ANI   1        ;
2396.0000           JZ    TTYIRUNC ;
2397.0000           DCR   A        ;
2398.0000           STA   TTYRES   ;
2399.0000           PUSH  B        ;
2400.0000           PUSH  D        ;
2401.0000           PUSH  H        ;
2402.0000 TTYIRWT:  RST   #7SLICER ;
2403.0000           DW    $+2      ;
2404.0000           IN    YSTATUS  ;
2405.0000           ANI   YINPR    ;
2406.0000           JNZ   TTYIRWT  ;
2407.0000           POP   H        ;
2408.0000           POP   D        ;
2409.0000           POP   B        ;
2410.0000           MVI   A,1      ;
2411.0000           STA   TTYRES   ;
2412.0000 TTYIRUNC: CALL  TUD      ;
2413.0000           IN    YSTATUS  ;
2414.0000           ANI   YINPR    ;
2415.0000           JNZ   TTYIRUNC ;
2416.0000           RET            ;
2417.0000 ;                        ;
2418.0000 TTYOR:    LDA   TTYRES   ;
2419.0000           ANI   1        ;
2420.0000           JZ    TTYORUNC ;
2421.0000           DCR   A        ;
2422.0000           STA   TTYRES   ;
2423.0000           PUSH  B        ;
2424.0000           PUSH  D        ;
2425.0000           PUSH  H        ;
2426.0000 TTYORWT:  RST   #7SLICER ;
2427.0000           DW    $+2      ;
2428.0000           IN    YSTATUS  ;
```

```
2429.0000              ANI  YOUTR     ;
2430.0000              JNZ  TTYORWT   ;
2431.0000              POP  H         ;
2432.0000              POP  D         ;
2433.0000              POP  B         ;
2434.0000              MVI  A,1       ;
2435.0000              STA  TTYRES    ;
2436.0000  TTYORUNC:   CALL TUD       ;
2437.0000              IN   YSTATUS   ;
2438.0000              ANI  YOUTR     ;
2439.0000              JNZ  TTYORUNC  ;
2440.0000              RET            ;
2441.0000  ;                          ;
2442.0000  ;          ;TTY DEMAND CHAR
2443.0000  ;          ;PULS READER ON OFF
2444.0000  TTYDC:      MVI  A,YONOFF  ;
2445.0000              OUT  YSTATUS   ;
2446.0000              XRA  A         ;
2447.0000              OUT  YSTATUS   ;
2448.0000              RET            ;
2449.0000  INCHAR:     CALL TTYDC     ;
2450.0000              CALL TTYIR     ;
2451.0000              IN   YDATA     ;
2452.0000              CMA            ;
2453.0000              ANI  7FH       ; NO PARITY
2454.0000              MOV  B,A       ;
2455.0000              LDA  ECHOST    ;
2456.0000              CPI  ZERO      ; IF ECHO STATUS=0
2457.0000              MOV  A,B       ;
2458.0000              RZ             ; THEN NO ECHOING
2459.0000              JMP  OUTCHAR   ; ECHO INPUT
2460.0000  OUTCHAR:    PUSH PSW       ;
2461.0000              MOV  B,A       ;
2462.0000              CALL TTYOR     ;
2463.0000              MOV  A,B       ;
2464.0000              CMA            ;
2465.0000              OUT  YDATA     ;
2466.0000              PUSH H         ; SERVE FORMAT...
2467.0000              CMA            ;
2468.0000              CPI  LF        ; WAS LINE FEED
2469.0000              JNZ  OUTC2     ;
2470.0000              MOV  B,A       ;
2471.0000              LDA  ECHOST    ;
2472.0000              ANI  80H       ;
2473.0000              MOV  A,B       ;
2474.0000              JZ   OUTC2     ;
2475.0000              LXI  H,LINECNT; INCR LINE COUNTER
2476.0000              INR  M         ;
2477.0000              MOV  A,M       ;
2478.0000              CPI  PGELNGTH  ; IF PAGE FULL
2479.0000              JNZ  OUTC4     ;
2480.0000              CALL CUTPAGE   ;
2481.0000  OUTC1:      MVI  A,LF      ; THEN INSERT
2482.0000              CALL OUTCHAR   ; LINE FEEDS
2483.0000              LXI  H,LINECNT ;
2484.0000              MOV  A,M       ; UNTIL PAGE FINISHED
2485.0000              CPI  PGEPHYS   ; PHYSICALY
2486.0000              JNZ  OUTC1     ;
2487.0000              MVI  M,0       ; CLEAR LINE COUNTER
2488.0000              JMP  OUTC4     ;
2489.0000  OUTC2:      LXI  H,LINEPOS; WAS CARRIGE RETURN
```

```
2490.0000              CPI  CR         ;
2491.0000              JNZ  OUTC3      ;
2492.0000              MVI  M,0        ; CLEAR LINE POSITION
2493.0000              JMP  OUTC4      ;
2494.0000 OUTC3:       INR  M          ; WAS PRINTABLE CHAR
2495.0000              MOV  A,M        ; INCR CHAR POSITION
2496.0000              CPI  LNELNGTH   ; IF MAX CHAR POS
2497.0000              CZ   CRLF       ; THEN INSERT  CR LF
2498.0000 OUTC4:       POP  H          ; RETRIEVE HL
2499.0000              POP  PSW        ;
2500.0000              MOV  B,A        ;
2501.0000              RET             ;
2502.0000 ;                            ;
2503.0000 CUTPAGE:     LXI  H,MSGCP    ; CUTTING IMAGE
2504.0000              CALL OUTSTRING  ;
2505.0000              LXI  H,PAGEC    ;
2506.0000              MOV  A,M        ;
2507.0000              INR  A          ;
2508.0000              DAA             ;
2509.0000              MOV  M,A        ;
2510.0000              CALL OUTINT     ;
2511.0000              MVI  A,CR       ;
2512.0000              JMP  OUTCHAR    ;
2513.0000 ;            ;PRINT CHARACTERS
2514.0000 ;            ;STARTING AT (HL) + 1 BLANK
2515.0000 ;            ;UNTIL MSB SET IN SOME BYTE
2516.0000 OUTSTRING:   MOV  A,M        ;
2517.0000              ANI  80H        ;
2518.0000              JNZ  BLANK      ;
2519.0000              MOV  A,M        ;
2520.0000              CALL OUTCHAR    ;
2521.0000              INX  H          ;
2522.0000              JMP  OUTSTRING  ;
2523.0000 ;            ;PRINT SUCCESSIVE STRINGS UNTIL DOUBLE STOP
2524.0000 OUTTEXT:     CALL OUTSTRING  ;
2525.0000              INX  H          ;
2526.0000              MOV  A,M        ;
2527.0000              CPI  STOP       ;
2528.0000              JNZ  OUTTEXT    ;
2529.0000              RET             ;
2530.0000 ;                            ;
2531.0000 BLANKS:      CALL BLANK      ;
2532.0000 BLANK:       PUSH PSW        ;
2533.0000              MVI  A,BLKCHAR  ;
2534.0000              CALL OUTCHAR    ;
2535.0000              POP  PSW        ;
2536.0000              RET             ;
2537.0000 ;                            ;
2538.0000 VARBLK:      PUSH PSW        ;
2539.0000              PUSH B          ;
2540.0000 VARBLK1:     CALL BLANK      ;
2541.0000              DCR  C          ;
2542.0000              JNZ  VARBLK1    ;
2543.0000              POP  B          ;
2544.0000              POP  PSW        ;
2545.0000              RET             ;
2546.0000 ;                            ;
2547.0000 INDGO:       MVI  A,GOCHAR   ;
2548.0000              CALL OUTCHAR    ;
2549.0000              JMP  BLANK      ;
2550.0000 ;                            ;
```

```
2551.0000 INDIGIT:  LXI   H,ECHOST  ;
2552.0000           MOV   C,M       ;
2553.0000           XRA   A         ;
2554.0000           MOV   M,A       ;
2555.0000           CALL  INCHAR    ;
2556.0000           MOV   M,C       ;
2557.0000           CALL  CHTOHEX   ;
2558.0000           JC    INDIGIT   ;
2559.0000           PUSH  PSW       ;
2560.0000           CALL  OUTDIGIT  ;
2561.0000           POP   PSW       ;
2562.0000           RET             ;
2563.0000 ;                         ;
2564.0000 CHTOHEX:  SUI   '0'       ;
2565.0000           RC              ;
2566.0000           ADI   '0'-'G'   ;
2567.0000           RC              ;
2568.0000           ADI   6         ;
2569.0000           JP    CHTOH1    ;
2570.0000           ADI   7         ;
2571.0000           RC              ;
2572.0000 CHTOH1:   ADI   10        ;
2573.0000           ORA   A         ;
2574.0000           RET             ;
2575.0000 ;                         ;
2576.0000 ININT:    CALL  INDIGIT   ;
2577.0000           RLC             ;
2578.0000           RLC             ;
2579.0000           RLC             ;
2580.0000           RLC             ;
2581.0000           ANI   0F0H      ;
2582.0000           PUSH  PSW       ;
2583.0000           CALL  INDIGIT   ;
2584.0000           ANI   0FH       ;
2585.0000           MOV   B,A       ;
2586.0000           POP   PSW       ;
2587.0000           ORA   B         ;
2588.0000           RET             ;
2589.0000 ;                         ;
2590.0000 ; GET A TWO DIGIT DECIMAL NUMBER,RETURN HEX EQUIV.
2591.0000 INDEC:    CALL  ININT     ;
2592.0000 ;                         ;
2593.0000 ; HEX ADJUST ACCUMULATOR
2594.0000 ; CONVERTS THE TWO DIGIT DEC (ADJUSTED) VALUE
2595.0000 ; IN A REG TO ITS HEXADECIMAL EQUIVALENT
2596.0000 ; NO CHECKING OF RANGE VALIDITY
2597.0000 HEXADJ:   PUSH  B         ;
2598.0000           MOV   B,A       ;
2599.0000           ANI   0OFH      ;
2600.0000           MOV   C,A       ;
2601.0000           MOV   A,B       ;
2602.0000           RRC             ;
2603.0000           RRC             ;
2604.0000           RRC             ;
2605.0000           RRC             ;
2606.0000           ANI   00FH      ;
2607.0000           MOV   B,A       ;
2608.0000           RLC             ;
2609.0000           RLC             ;
2610.0000           RLC             ;
2611.0000           ANI   0F8H      ;
2612.0000           ADD   B         ;
2613.0000           ADD   B         ;
```

```
2614.0000              ADD   C            ;
2615.0000              POP   B            ;
2616.0000              RET                ;
2617.0000 ;                               ;
2618.0000 CRLF2:       CALL  CRLF         ;
2619.0000 CRLF:        XRA   A            ;
2620.0000              STA   LINEPOS      ;
2621.0000              MVI   A,CR         ;
2622.0000              CALL  OUTCHAR      ;
2623.0000              MVI   A,LF         ;
2624.0000              JMP   OUTCHAR      ;
2625.0000 ;                               ;
2626.0000 PERIOD:      MVI   A,PERCHAR    ;
2627.0000              JMP   OUTCHAR      ;
2628.0000 ;                               ;
2629.0000 COLON:       MVI   A,03AH       ;
2630.0000              JMP   OUTCHAR      ;
2631.0000 ;                               ;
2632.0000 SLASH:       MVI   A,'/'        ;
2633.0000              JMP   OUTCHAR      ;
2634.0000 ;                               ;
2635.0000 ASTERISK:    MVI   A,'*'        ;
2636.0000              JMP   OUTCHAR      ;
2637.0000 ;                               ;
2638.0000 MAKE:        MVI   A,MAKECHAR   ;
2639.0000              JMP   OUTCHAR      ;
2640.0000 ;                               ;
2641.0000 EQUALS:      MVI   A,03DH       ;
2642.0000              JMP   OUTCHAR      ;
2643.0000 ;                               ;
2644.0000 DASH:        MVI   A,'-'        ;
2645.0000              JMP   OUTCHAR      ;
2646.0000 ;                               ;
2647.0000 OUTDIGIT:    CALL  HTOCHAR      ;
2648.0000              JMP   OUTCHAR      ;
2649.0000 ;                               ;
2650.0000 ; CONVERT HEX VALUE TO DECIMAL
2651.0000 ; NO ATTENTION IS PAYED TO VALUES
2652.0000 ; EXEEDING   DEC 99
2653.0000 ;                               ;
2654.0000 DECADJ:      MOV   B,A          ;
2655.0000              INR   B            ;
2656.0000              XRA   A            ; CLEAR CARRY
2657.0000              ADD   A            ; CLEAR AUXILIARY CARRY
2658.0000              JMP   DECADJ2      ;
2659.0000 DECADJ1:     INR   A            ;
2660.0000              DAA                ;
2661.0000 DECADJ2:     DCR   B            ;
2662.0000              JNZ   DECADJ1      ;
2663.0000              RET                ;
2664.0000 ;                               ;
2665.0000 OUTDEC:      CALL  DECADJ       ;
2666.0000 ;                               ;
2667.0000 OUTINT:      PUSH  PSW          ; TYPE
2668.0000              RRC                ; A RES
2669.0000              RRC                ; CONTENTS
2670.0000              RRC                ; AS
2671.0000              RRC                ; 2 HEX
2672.0000              CALL  OUTDIGIT     ; DIGITS
2673.0000              POP   PSW          ;
2674.0000              JMP   OUTDIGIT     ;
2675.0000 ;                               ;
```

```
2676.0000 HTOCHAR:   ANI   0FH        ; CONVERT DIGIT
2677.0000           CPI   0AH        ; HEX TO CHAR
2678.0000           JC    $+6        ;
2679.0000           ADI   'A'-0AH    ; VALUE IS(A...F)H
2680.0000           RET              ;
2681.0000           ADI   '0'        ; VALUE IS 0...9
2682.0000           RET              ;
2683.0000 ;                          ;
2684.0000 REPON:    MVI   A,0FFH     ; SWITCH ON
2685.0000           STA   REPORT     ; REPORT FLAGS
2686.0000           RET              ;
2687.0000 REPOFF:   MVI   A,00H      ; SWITCH OFF
2688.0000           STA   REPORT     ; REPORT FLAGS
2689.0000           RET              ;
2690.0000 ;                          ;
2691.0000 ;                          ;
2692.0000 ;SUBROUTINES FOR SRQ HANDLING, DEVICE STATUS
2693.0000 ;(WAIT-SIGNALS), ETC
2694.0000 ;                          ;
2695.0000 ;                          ;
2696.0000 ;                          ;
2697.0000 ;         ; ATTACH JU AS AVAILABLE MOD ALL
2698.0000 ;         ; RESULTS IN A CONDITIONAL CARRYING OUT
2699.0000 ;         ; OF A SIGNAL ON THE APROPRIATE
2700.0000 ;         ; SEMAPHORE
2701.0000 ;         ; SOME LOKAL UNIT LIST BASE LOADED
2702.0000 ATTACH:   LXI   H,ATTDET   ;
2703.0000           LDA   STFL&      ;
2704.0000           MOV   B,A        ;
2705.0000           ANA   M          ;
2706.0000           RNZ              ;
2707.0000           MOV   A,B        ;
2708.0000           ORA   M          ;
2709.0000           MOV   M,A        ;
2710.0000           LHLD  LULB&      ;
2711.0000 ATTACH1:  MVI   A,EOL      ; DETECT
2712.0000           CMP   M          ; END OF LIST
2713.0000           RZ               ;
2714.0000           PUSH  H          ; SAVE ENTRY ADDR
2715.0000           RST   #5GTSTW    ; SKIP IF
2716.0000           POP   H          ; NOT JU
2717.0000           JZ    ATTACH2    ;
2718.0000           CALL  QAVL       ; IF AVAILABLE...
2719.0000           CNZ   TONJU      ; TURN ON JU
2720.0000 ATTACH2:  CALL  HLUPDATE   ;
2721.0000           JMP   ATTACH1    ;
2722.0000 ;                          ;
2723.0000 TONJU:    PUSH  H          ; SAVE LIST ENTRY
2724.0000           RST   #5GTSTW    ; ADDR.
2725.0000           DCX   H          ; REFER TO SEMAPHORE
2726.0000           MOV   A,M        ;
2727.0000           ANI   SPHSIGN    ; SPH M S BIT
2728.0000           CZ    SIGNAL     ; IF VALUE <MAX
2729.0000           POP   H          ; RETRIEVE HL
2730.0000           RET              ;
2731.0000 ;                          ;
2732.0000 SIGNAL:   MOV   A,M        ; INCREMENT
2733.0000           ADI   SPHONE     ; SEMAPHORE
2734.0000           MOV   M,A        ;
2735.0000           RET              ;
2736.0000 ;                          ;
```

```
2737.0000 ;             ; DETACH JU   MOD ALL
2738.0000 ;             ; RESULTS IN A LOCK OPERATION
2739.0000 ;             ; ON THE APPROPRIATE SEMAPHORE
2740.0000 ;             ; UNLESS ITS VALUE EQUALS ZERO
2741.0000 ;             ; LOKAL UNIT LIST BASE LOADED
2742.0000 DETACH:  LXI  H,ATTDET ;
2743.0000          LDA  STFL&    ;
2744.0000          MOV  B,A      ;
2745.0000          ANA  M        ;
2746.0000          RZ            ;
2747.0000          MOV  A,B      ;
2748.0000          XRA  M        ;
2749.0000          MOV  M,A      ;
2750.0000          LHLD LULB&    ;
2751.0000 DETACH1: MVI  A,EOL    ; DETECT
2752.0000          CMP  M        ; LIST TOP
2753.0000          RZ            ;
2754.0000          PUSH H        ;
2755.0000          RST  #5GTSTW  ; IF JU
2756.0000          POP  H        ; THEN
2757.0000          CNZ  TOFFJU   ; TURN OFF JU
2758.0000          CALL HLUPDATE ;
2759.0000          JMP  DETACH1  ;
2760.0000 ;                      ;
2761.0000 TOFFJU:  PUSH H        ; SAVE LIST ENTRY
2762.0000          RST  #5GTSTW  ; REFER TO
2763.0000          DCX  H        ; SEMAPHORE
2764.0000          MOV  A,M      ;
2765.0000          ANI  SPHMSK   ; IF NOT ZERO
2766.0000          CNZ  LOCK     ; LOCK
2767.0000          POP  H        ;
2768.0000          RET           ;
2769.0000 ;                      ;
2770.0000 LOCK:    MOV  A,M      ; DECREMENT
2771.0000          SUI  SPHONE   ; SEMAPHORE
2772.0000          MOV  M,A      ;
2773.0000          RET           ;
2774.0000 ;             ; CHECK SEMAPHORE MODIFY A
2775.0000 ;             ; RESULTS IN ZERO=1
2776.0000 ;             ; IF SEMAPHORE IS LESS THAN 2
2777.0000 ;             ; LOKAL UNIT LIST ENTRY LOADED , REMAINS
2778.0000 CHECKSPH: PUSH H       ; SAVE HL
2779.0000          RST  #5GTSTW  ; REFER
2780.0000          DCX  H        ; TO
2781.0000          MOV  A,M      ; SEMAPHORE
2782.0000          ANI  SPHSIGN  ; ZERO:=1 IF
2783.0000          POP  H        ; VALUE < 2
2784.0000          RET           ;
2785.0000 ;                      ;
2786.0000 DISPLST: MOV  C,M      ;CALCULATE
2787.0000 DISPLST1: MVI B,0      ;DISPLACEMENT
2788.0000          LXI  H,STTBLE ;
2789.0000          DAD  B        ;
2790.0000          RET           ;
2791.0000 ;                      ;
2792.0000 DISPLDEM: MOV C,M      ;CALCULATE
2793.0000          MVI  B,0      ;DISPLACEMENT
2794.0000          LXI  H,DEMTBLE;
2795.0000          DAD  B        ;
2796.0000          RET           ;
2797.0000 ;                      ;
```

```
2798.0000 ;            ; NORMALIZE STATUS MODIFY A,B,C
2799.0000 ;            ; STATUS.WAIT,IDLE:=0,1
2800.0000 ;            ; LOKAL UNIT LIST ENTRY ADDRESS
2801.0000 ;            ; AT HL, REMAINS
2802.0000 NORMSTAT: PUSH H        ; SAVE HL
2803.0000          CALL DISPLST   ;HL-STAT.TABLE ENTR
2804.0000          MVI  A,STATMSK ; PROTECT
2805.0000          CMA            ; PRIORITY
2806.0000          ANA  M         ; WAIT:=0
2807.0000          ORI  IDLESTAT  ; IDLE:=1
2808.0000          MOV  M,A       ;
2809.0000          POP  H         ; RETRIEVE HL
2810.0000          RET            ;
2811.0000 ;                       ;
2812.0000 ;            ; RESET IDLE STATUS MODIFY A,B,C
2813.0000 ;            ; ADDR. OF ENTRY IN LOKAL UNIT LIST
2814.0000 ;            ; HELD AT HL , REMAINS
2815.0000 NOIDLE:   PUSH H        ; SAVE HL
2816.0000          CALL DISPLST   ; CALCULATE
2817.0000          MVI  A,IDLESTAT; RESET
2818.0000          CMA            ; IDLE STATUS
2819.0000          ANA  M         ; FLAG
2820.0000          MOV  M,A       ;
2821.0000          POP  H         ; RETRIEV HL
2822.0000          RET            ;
2823.0000 ;                       ;
2824.0000 ;            ; SET WAIT STATUS MOD A,B,C
2825.0000 ;            ; ADDR. OF ENTRY IN LOKAL UNIT LIST
2826.0000 ;            ; HELD AT HL, REMAINS
2827.0000 STWAIT:   PUSH H        ; SAVE HL
2828.0000          CALL DISPLST   ; CALCULATE
2829.0000          MVI  A,WAITSTAT; SET
2830.0000          ORA  M         ; WAIT STATUS
2831.0000          MOV  M,A       ; FLAG
2832.0000          POP  H         ; RETRIEVE HL
2833.0000          RET            ;
2834.0000 ;                       ;
2835.0000 ;            ;AU UNITS IDLE MOD ALL
2836.0000 ;            ; RESULTS IN ZERO:=1
2837.0000 ;            ; IF IDLE STATUS IS SET FOR
2838.0000 ;            ; ALL UNITS IN LIST WHOSE
2839.0000 ;            ; BASE IS HELD AT HL
2840.0000 ;            ; OTHERWISE ZERO:=0
2841.0000 ALLIDLE:  LHLD LULB&    ;
2842.0000 ALLIDLE1: MOV  A,M      ; DETECT EOL
2843.0000          CPI  EOL       ; ALL UNITS ARE
2844.0000          RZ             ; IDLE
2845.0000          CALL GTPST     ;
2846.0000          ANI  IDLESTAT  ; IS IDLE
2847.0000          JNZ  $+5       ;
2848.0000          INR  A         ; NON IDLE UNIT
2849.0000          RET            ; FOUND ZERO=0
2850.0000          CALL HLUPDATE  ;   STOP
2851.0000          JMP  ALLIDLE1  ;
2852.0000 ;                       ;
2853.0000 ;            ;INCREMENT JOB ACCOUNT
2854.0000 INCRACC:  LXI  H,ACCTS  ;LOAD ACCOUNT REF
2855.0000          CALL DISPLP2   ;
2856.0000          XRA  A         ; CLEAR CARRY
2857.0000          INR  A         ; CLEAR AUX. CARRY
2858.0000          MOV  A,M       ; LOAD TENS & DIGITS
2859.0000          INR  A         ; INCR
2860.0000          DAA            ; RESTORE
```

```
2861.0000               MOV     M,A         ; TENS & DIGITS
2862.0000               RNC                 ; LESSEQUAL 99
2863.0000               INX     H           ; REFER TH & HUND
2864.0000               XRA     A           ; CLEAR CARRY
2865.0000               INR     A           ;   AUX CARRY
2866.0000               MOV     A,M         ; LOAD TH & HUNDR
2867.0000               INR     A           ; INCR
2868.0000               DAA                 ;
2869.0000               MOV     M,A         ; RESTORE
2870.0000               RET                 ;
2871.0000       ;                           ;
2872.0000       ;       ; SIGNALIZE CANCEL MOD ALL
2873.0000       ;       ; ENTRY ADDR AT HL
2874.0000       ;       ; ZERO:=1 IF NON JU
2875.0000 SICCL:        LHLD    DSQP&       ;
2876.0000 SICCLHL:      RST     #5GTSTW     ;
2877.0000               RZ                  ;
2878.0000               MVI     A,JUCCLFL   ;
2879.0000               ORA     B           ;
2880.0000               MOV     M,A         ;
2881.0000               RET                 ;
2882.0000       ;                           ;
2883.0000       ;       ; CHECK AVAILIBILITY MOD ALL
2884.0000       ;       ; OF DEVICES INVOLVED
2885.0000       ;       ; IN SOME JOB (EXCEPT AIR CONTROL)
2886.0000 CHAVAIL:      LHLD    SRCP&       ;
2887.0000               CALL    QAVL        ;
2888.0000               RZ                  ;
2889.0000               CALL    GTML        ;
2890.0000               JZ      CHAVL1      ;
2891.0000               CALL    QAVL        ;
2892.0000               RZ                  ;
2893.0000 CHAVL1:       LHLD    DSTP&       ;
2894.0000               CALL    QAVL        ;
2895.0000               RZ                  ;
2896.0000               CALL    GTML        ;
2897.0000               JZ      CMFLAGS     ;
2898.0000               JMP     QAVL        ;
2899.0000       ;                           ;
2900.0000       ;       ; CHECK AVAILIBILITY MOD ALL
2901.0000       ;       ; OF DEVICES INVOLVED
2902.0000       ;       ; IN SOME SEND REQUEST
2903.0000 CHAVAILQ:     LHLD    SRQP&       ;
2904.0000               CALL    QAVL        ;
2905.0000               RZ                  ;
2906.0000               CALL    GTML        ;
2907.0000               JZ      CHAVLQ1     ;
2908.0000               CALL    QAVL        ;
2909.0000               RZ                  ;
2910.0000 CHAVLQ1:      LHLD    DSQP&       ;
2911.0000               CALL    QAVL        ;
2912.0000               RZ                  ;
2913.0000               CALL    GTML        ;
2914.0000               JZ      CMFLAGS     ;
2915.0000               JMP     QAVL        ;
2916.0000       ;                           ;
2917.0000       ;       ; RESET SEND REQUEST
2918.0000       ;       ; ADDR OF UNIT ENTRY AT HL
2919.0000 FRSRQ:        LHLD    SRQP&       ;
2920.0000 FRSRQHL:      CALL    FSHIFT      ;
2921.0000               JMP     FRESET      ;
2922.0000       ;                           ;
2923.0000       ;       ; ACTIVATE ARIVALINDICATOR MOD A,B
2924.0000       ;       ; ARIND VALUE AT D REGISTER
2925.0000       ;       ; ADDR OF RECEIVER ENTRY AT HL
```

```
2926.0000 AARIND:    MOV   A,M       ;
2927.0000            OUT   ADDRP     ;
2928.0000            MOV   A,D       ;
2929.0000            ORI   11110000B ;
2930.0000            OUT   ARINP     ;
2931.0000            CALL  DELYARIV  ;
2932.0000            JMP   NORMLINES ;
2933.0000 DELYARIV:  MVI   C,20      ; 20 * 1MS
2934.0000            XRA   A         ;
2935.0000 DELY1:     INR   A         ; %
2936.0000            CMP   C         ; %
2937.0000            RZ              ; %
2938.0000            CALL  ONEMSEC   ; %
2939.0000            JMP   DELY1     ; %
2940.0000 ONEMSEC:   PUSH  PSW       ;
2941.0000            MVI   B,99      ; 100 * 10US = 1MS
2942.0000            XRA   A         ;
2943.0000            INR   A         ; 2US
2944.0000            CMP   B         ; 2US
2945.0000            JNZ   $-2       ; 6US
2946.0000            POP   PSW       ;
2947.0000            RET             ;
2948.0000 ;                          ;
2949.0000 ;                          ;
2950.0000 NTRLV:     CALL  NTRAC     ;
2951.0000            LHLD  DOMN&     ;
2952.0000            CALL  NTRUNIT   ;
2953.0000            LHLD  COLL&     ;
2954.0000            JMP   NTRUNIT   ;
2955.0000 ;                          ;
2956.0000 CLVCTRES:  PUSH  PSW       ;CLEAR RESERVATION
2957.0000            LHLD  DOMN&     ;OF DOMAIN UNIT
2958.0000            RST   #5GTSTW   ;IN CASE OF JU
2959.0000            JZ    CLVCTR1   ;
2960.0000            DCX   H         ;GET STATUS FIELD
2961.0000            MVI   A,VCTRES  ;FLAG MASK
2962.0000            CMA             ;
2963.0000            ANA   M         ;CLEAR FLAG
2964.0000            MOV   M,A       ;
2965.0000 CLVCTR1:   POP   PSW       ;
2966.0000            RET             ;
2967.0000 ;                          ;
2968.0000 ;                          ;
2969.0000 ;                          ;
2970.0000 NTRL:      CALL  NTRAC     ;
2971.0000            LHLD  SRCP&     ;
2972.0000            CALL  NTRUNIT   ;
2973.0000            LHLD  DSTP&     ;
2974.0000            JMP   NTRUNIT   ;
2975.0000 ;                          ;
2976.0000 ;                          ;
2977.0000 ;                          ;
2978.0000 MSGCP:     DB    CR,LF,LF,'------------------'
2979.0000            DB    CR,LF,LF,20H,20H,20H,20H,20H,20H,20H,20H,20H
2980.0000            DB    CR,20H,20H,20H,20H,80H
2981.0000 MSGCN:     DB    'CONSTRUCTION',STOP
2982.0000 MSGML:     DB    '  MINOR LINE',STOP
2983.0000 MSGJU:     DB    'JUNCTION UNIT',STOP
2984.0000 MSGTA:     DB    CR,LF,'...TERMINALS ACCESSIBLE: ',STOP
2985.0000 MSGPSE:    DB    ' *** PROM SYNTACTICAL ERROR',STOP
2986.0000 MSGREGH:   DB    CR,LF,' STK-2 STK-1 PC... A PSW'
2987.0000            DB    ' B--C. D--E. H--L.',CR,LF,STOP
2988.0000 MSGMSG:    DB    LF,' *** MSG',STOP
2989.0000 MSGTO:     DB    ' -->',STOP
2990.0000 MSGAT:     DB    ' AT',STOP
```

I claim as my invention:

1. A conveyor system with dispatching and receiver stations having station-individual control sets, which are coupled to control and signal devices for the station, said control sets being connected in parallel to a multiconductor address line for coupling to a central program control device, the dispatching stations each having a destination selection device, and dispatching stations ready for dispatching being activated by applying station-individual address information to the address line by means of the program control device, and the dispatching stations each having an assigned address decoder for responding to the applied address information when coincidence is present for enabling communication with the program control device via an acknowledgement line jointly assigned to all stations, characterized in that all control sets have an operation decoder (OpD) which can be switched ready for operation by means of an actuation signal of the assigned address decoder (Dh, Dz), a multiconductor control line (sl 1 through sl 4) for coupling the switched operation decoder (OpD) to the program control device such that the switched operation decoder (OpD) of an activated dispatching station responds after the output of operation information from the program control device to the control line (sl 1 . . . sl 4) to effect a destination information transfer operation, the destination selection device (Z0 through Z9) of each dispatching station being connected to the address line (al 1 . . . al 12) in parallel with the assigned address decoder (Dh, Dz) for the transmission of destination information identifying a desired receiver station to the central program control device via the address line, and each receiver station being responsive to address information produced by the program control device in accordance with such transmitted destination information, and said operation decoders of the dispatching and receiver stations being responsive to operation information for introducing and concluding the conveyor process.

2. A conveyor system according to claim 1, including drive, return and blocking devices, in addition to the dispatching and the receiver stations present, connected in parallel to the address line (al 1 . . . al 12), to the acknowledgement line (q1) and to the control line (sl 1 . . . sl 4).

3. A conveyor system according to claim 2, including control sets with operation decoders coupled to the drive, return and blocking devices assigned to a conveyor path determined by a dispatching station and a receiver station with the aid of the corresponding address information, and said operation decoders being responsive to information for the appertaining devices to establish a desired conveyor process.

4. A conveyor system according to claim 2, including operation signal stores (OS1 . . . OS7) respectively connected to outputs (S1, S3, S5, S7, S9, S12, S14) of the control setindividual operation decoders (OpD), said operation signal stores having outputs for connection to respective ones of the control and signal devices.

5. A conveyor system according to claim 4, wherein said operation decoder (OpD) exhibits a reset output (S4) for several operation signal stores (OS2, OS3, OS4, OS5).

6. A conveyor system according to claim 4, including signal adjustment circuits connected to certain outputs (S1, S3, S5, S7, S9, S11) of the operation decoders for supplying actuating signals to the control and signal devices.

7. A conveyor system according to claim 4, wherein control circuits are assigned to individual control devices, said control circuits being responsive to the outputs of the assigned signal stores to actuate the respective individual control devices.

8. A conveyor system according to claim 1, wherein said operation decoder (OpD) has AND-gates (U13, U17, U18) associated herewith and exhibits outputs (S2, S13, S15), for conveying switching signals to the AND-gates (U13, U17, U18) in response to respective corresponding interrogation codes supplied by the program control device to the control line (sl 1 . . . sl 4), said AND-gates being connected at their respectively other input to an output of a status signal store (ZS1, ZS3, ZS2) which is assigned to one of the control and signal devices, and an OR-gate (Q0) connected to the acknowledgement lines (q1) and having respective inputs connected to the respective outputs of said AND-gates.

9. A conveyor system according to claim 8, wherein said status signal stores (ZS1, ZS2, ZS3) exhibit a reset input automatically activated when connecting through the respectively subordinate AND-gate (U13, U17, U18).

10. A conveyor system according to claim 1, wherein the operation decoders (OpD) of all control sets are connected to a common pulse line (t1), which conveys pulses that switch the operation decoders (OpD) ready for reception when corresponding address information is present on the address line (al 1 through al 12).

* * * * *